(12) United States Patent
Itagaki et al.

(10) Patent No.: US 9,832,804 B2
(45) Date of Patent: Nov. 28, 2017

(54) DEVICE AND METHOD FOR WIRELESS COMMUNICATION

(71) Applicant: SONY CORPORATION, Tokyo (JP)

(72) Inventors: Takeshi Itagaki, Saitama (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/113,622

(22) PCT Filed: Jan. 8, 2015

(86) PCT No.: PCT/JP2015/050353
§ 371 (c)(1),
(2) Date: Jul. 22, 2016

(87) PCT Pub. No.: WO2015/115146
PCT Pub. Date: Aug. 6, 2015

(65) Prior Publication Data
US 2017/0013654 A1  Jan. 12, 2017

(30) Foreign Application Priority Data
Feb. 3, 2014  (JP) .................. 2014-018874

(51) Int. Cl.
H04W 8/02   (2009.01)
H04W 76/06  (2009.01)
H04W 76/02  (2009.01)
H04W 8/00   (2009.01)
H04W 12/06  (2009.01)

(52) U.S. Cl.
CPC ......... *H04W 76/023* (2013.01); *H04W 8/005* (2013.01); *H04W 12/06* (2013.01); *H04W 76/02* (2013.01)

(58) Field of Classification Search
CPC ..... H04W 8/00; H04W 8/005; H04W 76/023; H04W 8/02; H04W 76/06
See application file for complete search history.

(56) References Cited

U.S. PATENT DOCUMENTS 8,594,632 B1 * 11/2013 Azizi .................... H04W 12/06
                                                455/411
9,414,421 B2 *  8/2016 Turtinen ............ H04W 76/023
(Continued)

FOREIGN PATENT DOCUMENTS

JP    2003-143289 A    5/2003
JP    2006-074680 A    3/2006
(Continued)

Primary Examiner — Blane Jackson
(74) Attorney, Agent, or Firm — Chip Law Group

(57) ABSTRACT

[Object] To make it possible to prevent a direct connection between unintended wireless communication terminals without distributing identification information of wireless communication terminals.
[Solution] There is provided a device including an acquisition unit configured to acquire identification information that is identification information for a direct connection between two wireless communication terminals and is issued by another device that is different from the two wireless communication terminals, and a control unit configured to perform control for the direct connection using the identification information.

19 Claims, 15 Drawing Sheets

(56) References Cited

U.S. PATENT DOCUMENTS

| | | | | |
|---|---|---|---|---|
| 2011/0082940 A1* | 4/2011 | Montemurro | ........... | H04L 69/24 709/227 |
| 2012/0179789 A1* | 7/2012 | Griot | .................... | H04W 12/08 709/220 |
| 2014/0003373 A1* | 1/2014 | Hakola | ................. | H04W 48/16 370/329 |
| 2014/0115058 A1* | 4/2014 | Yin | ..................... | H04W 76/023 709/204 |
| 2014/0220936 A1* | 8/2014 | Turtinen | .............. | H04L 67/104 455/411 |

FOREIGN PATENT DOCUMENTS

| | | | | |
|---|---|---|---|---|
| JP | 2012-502587 A | 1/2012 | | |
| KR | WO 2015046868 A1 * | 4/2015 | ............ | H04W 76/02 |
| WO | 2012/097075 A | 7/2012 | | |
| WO | 2012/097075 A2 | 7/2012 | | |

\* cited by examiner

FIG.3

| CONNECTION ID | TERMINAL ID (1st TERMINAL) | TERMINAL ID (2nd TERMINAL) | ROLE (1st TERMINAL) | ROLE (2nd TERMINAL) | CHANNEL | CONNECTION STATUDS |
|---|---|---|---|---|---|---|
| ABCDEFG | 194568723645 1658 | 359815544944 9985 | GROUP OWNER | CLIENT | 11 | NOT CONNECTED |
| ... | ... | ... | ... | ... | ... | ... |

FIG.5

| CONNECTION ID | MAC ADRESS (ANOTHER TERMINAL) | ID VERIFICATION STATUS | CONNECTION RECEPTION STATUS |
|---|---|---|---|
| ABCDEFG | UNKNOWN | VALID | REJECT |
| ⋮ | ⋮ | ⋮ | ⋮ |

FIG.6

| CONNECTION ID | MAC ADRESS (ANOTHER TERMINAL) | ID VERIFICATION STATUS | CONNECTION RECEPTION STATUS |
|---|---|---|---|
| ABCDEFG | UNKNOWN | – | – |
| ⋮ | ⋮ | ⋮ | ⋮ |

FIG.7

| CONNECTION ID | MAC ADRESS (ANOTHER TERMINAL) | ID VERIFICATION STATUS | CONNECTION RECEPTION STATUS |
|---|---|---|---|
| ABCDEFG | 00:11:22:33:44:bb | INVALID | ADMIT |
| ⋮ | ⋮ | ⋮ | ⋮ |

FIG.8

| CONNECTION ID | MAC ADRESS (ANOTHER TERMINAL) | ID VERIFICATION STATUS | CONNECTION RECEPTION STATUS |
|---|---|---|---|
| ABCDEFG | 00:11:22:33:44:bb | INVALID | REJECT |
| ⋮ | ⋮ | ⋮ | ⋮ |

FIG.9

| CONNECTION ID | MAC ADRESS (ANOTHER TERMINAL) | ID VERIFICATION STATUS | CONNECTION RECEPTION STATUS |
|---|---|---|---|
| ABCDEFG | 55:66:77:88:99:cc | – | – |
| ⋮ | ⋮ | ⋮ | ⋮ |

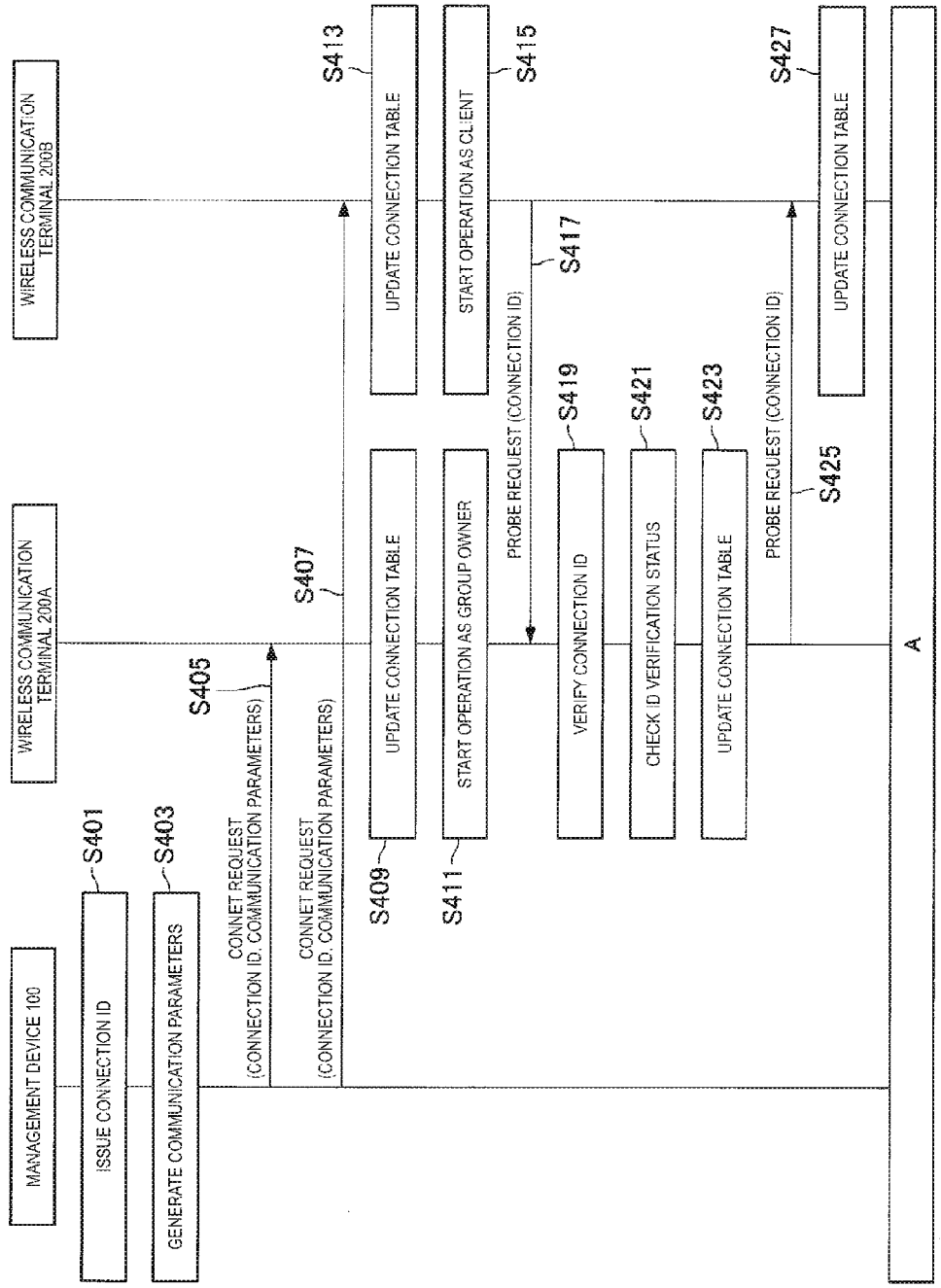

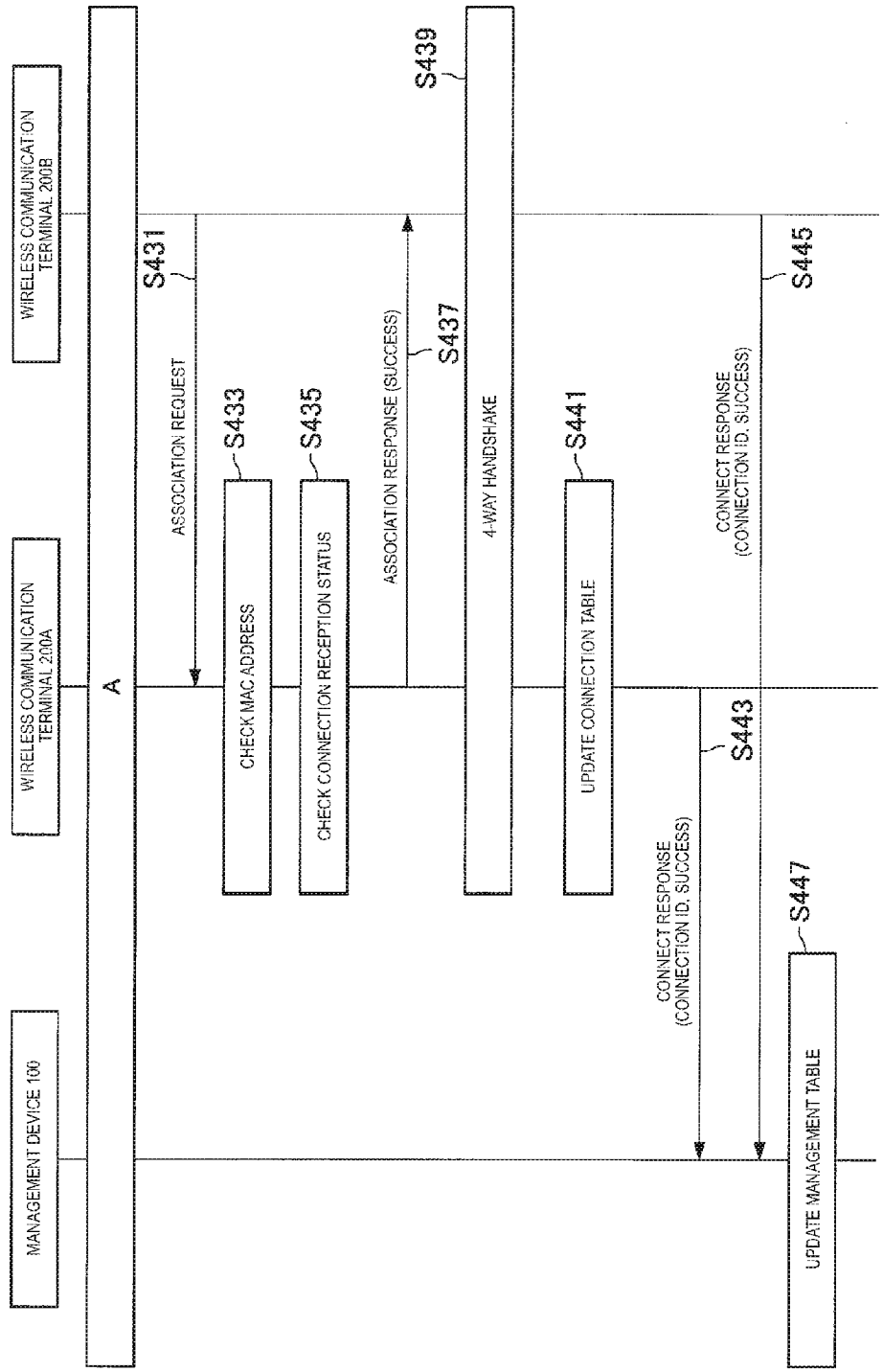

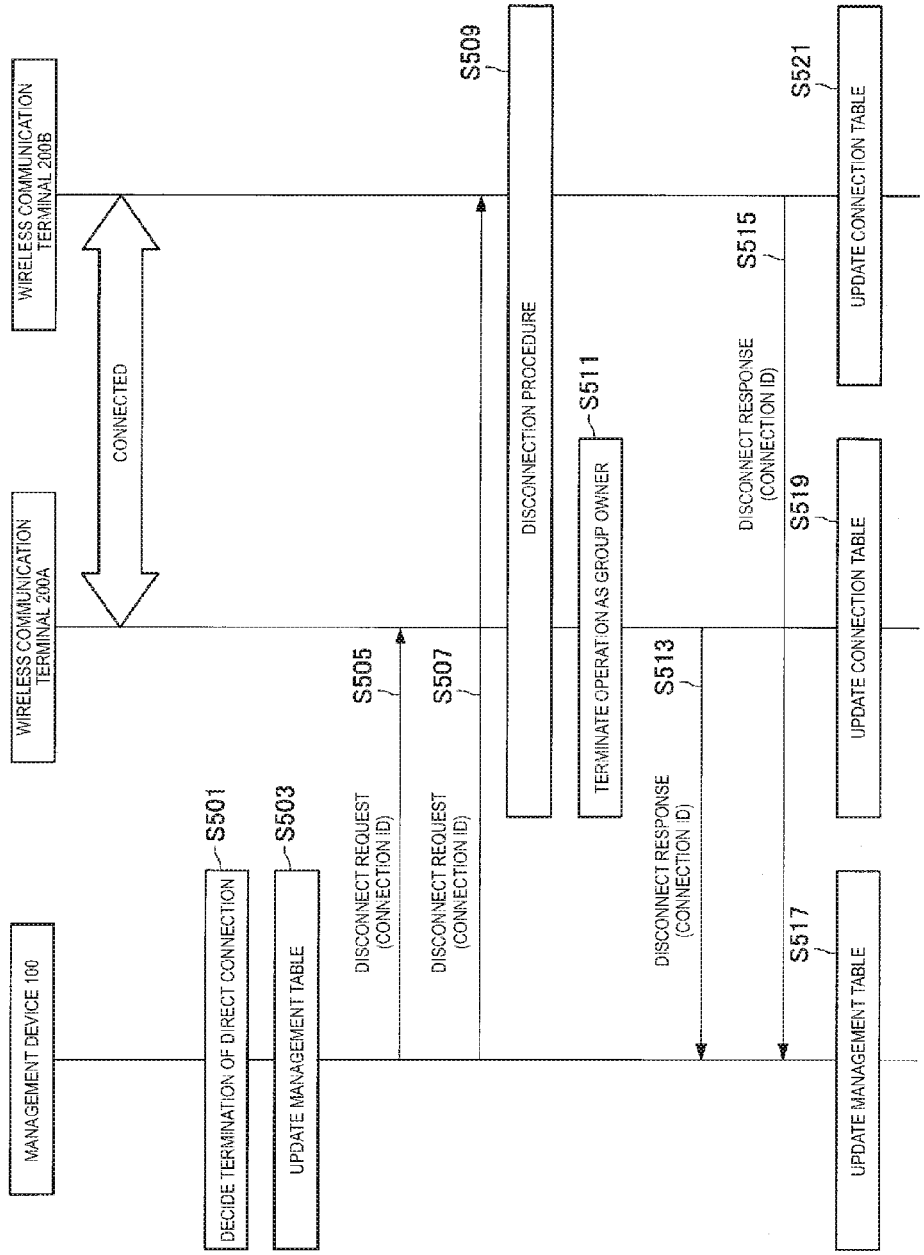

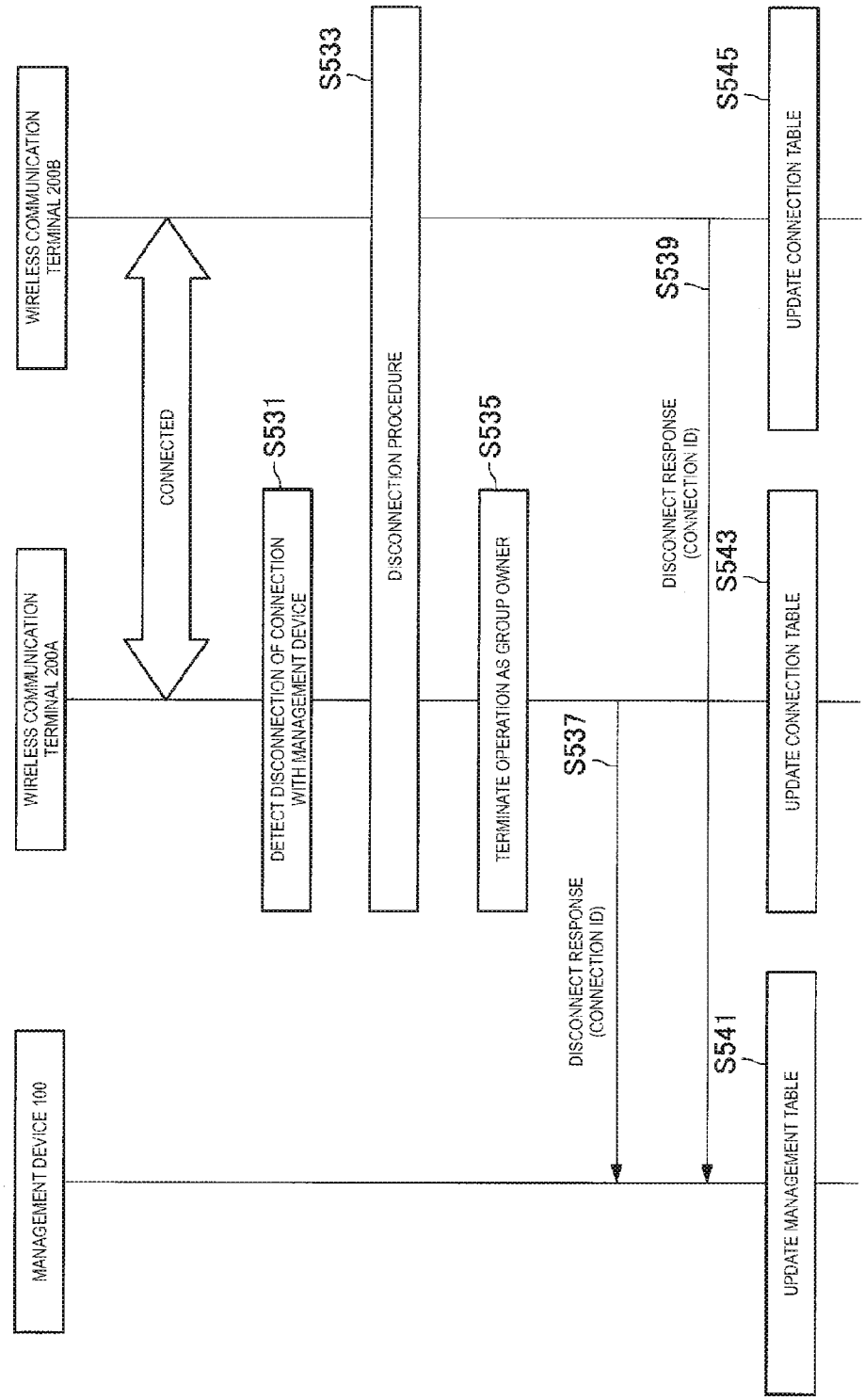

DEVICE AND METHOD FOR WIRELESS COMMUNICATION

CROSS REFERENCE TO RELATED APPLICATIONS

This application is a U.S. National Phase of International Patent Application No. PCT/JP2015/050353 filed on Jan. 8, 2015, which claims priority benefit of Japanese Patent Application No. 2014-018874 filed in the Japan Patent Office on Feb. 3, 2014. Each of the above-referenced applications is hereby incorporated herein by reference in its entirety.

TECHNICAL FIELD

The present disclosure relates to a device and a method.

BACKGROUND ART

Mobile communication has become widespread due to its convenience. For example, a wireless communication terminal that performs mobile communication is connected to a base station, and thus can use various network services via a network of a service provider, the Internet, and the like. On the other hand, two wireless communication terminals can be connected to each other to perform communication for calling, file exchange, games, and the like.

Patent Literature 1 discloses a wireless router which, for example, upon receiving a packet from a wireless communication terminal having a MAC address that is registered in a table beforehand, discards the packet and rejects a connection with the wireless communication terminal.

CITATION LIST

Patent Literature

Patent Literature 1: JP 2006-074680A

SUMMARY OF INVENTION

Technical Problem

However, according to the technology disclosed in Patent Literature 1, it is difficult to prevent unintended wireless communication terminals from being connected to each other. To be more specific, when unintended wireless communication terminals attempt to communicate with each other via a wireless router in the technology disclosed in Patent Literature 1, for example, the communication can be prevented, but it is not possible to prevent a direct connection between the wireless communication terminals. In addition, even if the technology disclosed in Patent Literature 1 is applied to a wireless communication terminal, if the MAC address of another wireless communication terminal (for example, another wireless communication terminal with ill intent) is not registered in a table of the wireless communication terminal, it is not possible to prevent the wireless communication terminal and the other wireless communication terminal from being directly connected to each other.

Note that, in order to prevent unintended wireless communication terminals from being connected to each other, for example, a technique in which any node acquires a link layer address of one wireless communication terminal of the two wireless communication terminals which can be directly connected to each other and provides the other wireless communication terminal of the two wireless communication terminals with the link layer address can be considered. However, according to this technique, there is concern of, for example, identification information (for example, a link layer address) of wireless communication terminals being recklessly leaked.

Therefore, it is desirable to provide a mechanism that can prevent a direct connection between unintended wireless communication terminals without distributing identification information of wireless communication terminals.

Solution to Problem

According to the present disclosure, there is provided a device including: an acquisition unit configured to acquire identification information that is identification information for a direct connection between two wireless communication terminals and is issued by another device that is different from the two wireless communication terminals; and a control unit configured to perform control for the direct connection using the identification information.

According to the present disclosure, there is provided a method including: acquiring identification information that is identification information for a direct connection between two wireless communication terminals and is issued by another device that is different from the two wireless communication terminals; and performing, by a processor, control for the direct connection using the identification information.

According to the present disclosure, there is provided a device including: a management unit configured to issue identification information for a direct connection between two wireless communication terminals; and a notification unit configured to notify the two wireless communication terminals of the identification information.

According to the present disclosure, there is provided a method including: issuing, by a processor, identification information for a direct connection between two wireless communication terminals; and notifying the two wireless communication terminals of the identification information.

Advantageous Effects of Invention

According to the present disclosure described above, it is possible to prevent a connection between unintended wireless communication terminals without distributing identification information of wireless communication terminals. Note that the effect described above is not necessarily limited, and along with or instead of the effect, any effect that is desired to be introduced in the present specification or other effects that can be expected from the present specification may be exhibited.

BRIEF DESCRIPTION OF DRAWINGS

FIG. 3 is an explanatory diagram for describing an example of a management table.

FIG. 5 is an explanatory diagram for describing a first example of information to be registered in a connection table when the role of a wireless communication terminal is a first role.

FIG. 6 is an explanatory diagram for describing a first example of information to be registered in a connection table when the role of a wireless communication terminal is a second role.

FIG. 7 is an explanatory diagram for describing a second example of information to be registered in a connection table when the role of a wireless communication terminal is a first role.

FIG. 8 is an explanatory diagram for describing a third example of information to be registered in a connection table when the role of a wireless communication terminal is a first role.

FIG. 9 is an explanatory diagram for describing a second example of information to be registered in a connection table when the role of a wireless communication terminal is a second role.

FIG. 10A is (the first half of) a sequence diagram illustrating an example of a schematic flow of a connection process according to the same embodiment.

FIG. 10B is (the second half of) the sequence diagram illustrating the example of the schematic flow of the connection process according to the same embodiment.

FIG. 11 is a sequence diagram illustrating an example of a schematic flow of a first termination process according to the same embodiment.

FIG. 12 is a sequence diagram illustrating an example of a schematic flow of a second termination process according to the same embodiment.

DESCRIPTION OF EMBODIMENT(S)

Figure 1:
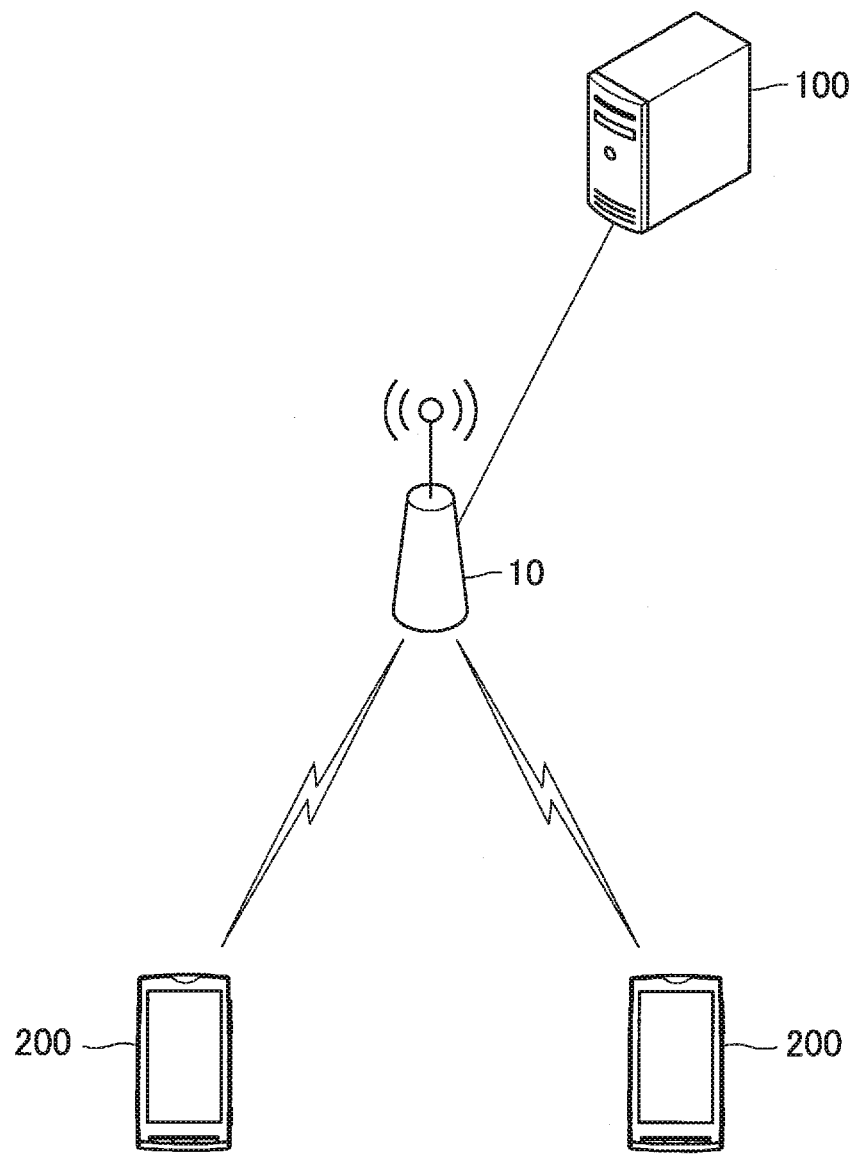
FIG. 1 is an illustrative diagram illustrating an example of a schematic configuration of a communication system according to an embodiment of the present disclosure.

Hereinafter, preferred embodiments of the present disclosure will be described in detail with reference to the appended drawings. In this specification and the drawings, elements that have substantially the same function and structure are denoted with the same reference signs, and repeated explanation is omitted.

Furthermore, there are cases in which elements having substantially the same functional configuration are distinguished by affixing different alphabets to the same reference numeral in the present specification and the drawings. For example, a plurality of elements having substantially the same functional configuration are distinguished, such as wireless communication terminals 200A, 200B, and 200C, if necessary. However, when it is not particularly necessary to distinguish such a plurality of elements having substantially the same functional configuration, only the same reference numeral is given. For example, when it is not particularly necessary to distinguish wireless communication terminals 200A, 200B, and 200C, they are simply referred to as wireless communication terminals 200.

Note that description will be provided in the following order.

1. Schematic configuration of a communication system
2. Configurations of devices
2.1. Configuration of a management device
2.2. Configuration of a wireless communication terminal
3. Process flows
3.1. Flow of a connection process
3.2. Flow of a termination process
4. Modified example
4.1. Configuration of a wireless communication terminal
4.2. Process flow
5. Application examples
5.1. Application example of a management device
5.2. Application example of a wireless communication terminal
6. Conclusion 1. Schematic Configuration of a Communication System First, a schematic configuration of a communication system 1 according to an embodiment of the present disclosure will be described with reference to FIG. 1. FIG. 1 is an illustrative diagram illustrating an example of the schematic configuration of the communication system 1 according to the present embodiment. Referring to FIG. 1, the communication system 1 includes a connection node 10, a management device 100, and two or more wireless communication terminals 200.

The connection node 10 performs wireless communication with the wireless communication terminals 200 that are positioned within the communication area of the connection node 10. In addition, the connection node 10 communicates with the management device 100 via a network. For example, the connection node 10 transfers information transmitted from the management device 100 to the wireless communication terminals 200, and transfers information transmitted from the wireless communication terminals 200 to the management device 100. The connection node 10 is, as an example, a base station of a cellular network.

The management device 100 manages a direct connection between the wireless communication terminals 200. For example, the management device 100 manages a direct connection between the two wireless communication terminals 200.

When positioned within the communication area of the connection node 10, the wireless communication terminals 200 are connected to the connection node 10 to perform wireless communication with the connection node 10. In addition, each wireless communication terminal 200 is directly connected to the other wireless communication terminal 200 to perform wireless communication with the other wireless communication terminal 200.

Note that, although only the 2 wireless communication terminals 200 are illustrated in FIG. 1, the communication system 1 may of course include three or more wireless communication terminals 200.

One example of the schematic configuration of the communication system 1 according to the present embodiment has been described. According to the present embodiment, the management device 100 issues identification information for the direct connection between the two wireless communication terminals 200, and notifies the two wireless communication terminals 200 of the identification information. In addition, the two wireless communication terminals 200 perform control for the direct connection between the two wireless communication terminals 200 using the identification information. Accordingly, for example, it is possible to prevent a connection with an unintended wireless communication terminal 200 without distributing the identification information of the wireless communication terminals 200.

2. Configurations of Devices

Next, configurations of respective devices according to the present embodiment will be described with reference to FIGS. 2 to 9.

<2.1. Configuration of a Management Device>>

Figure 2:
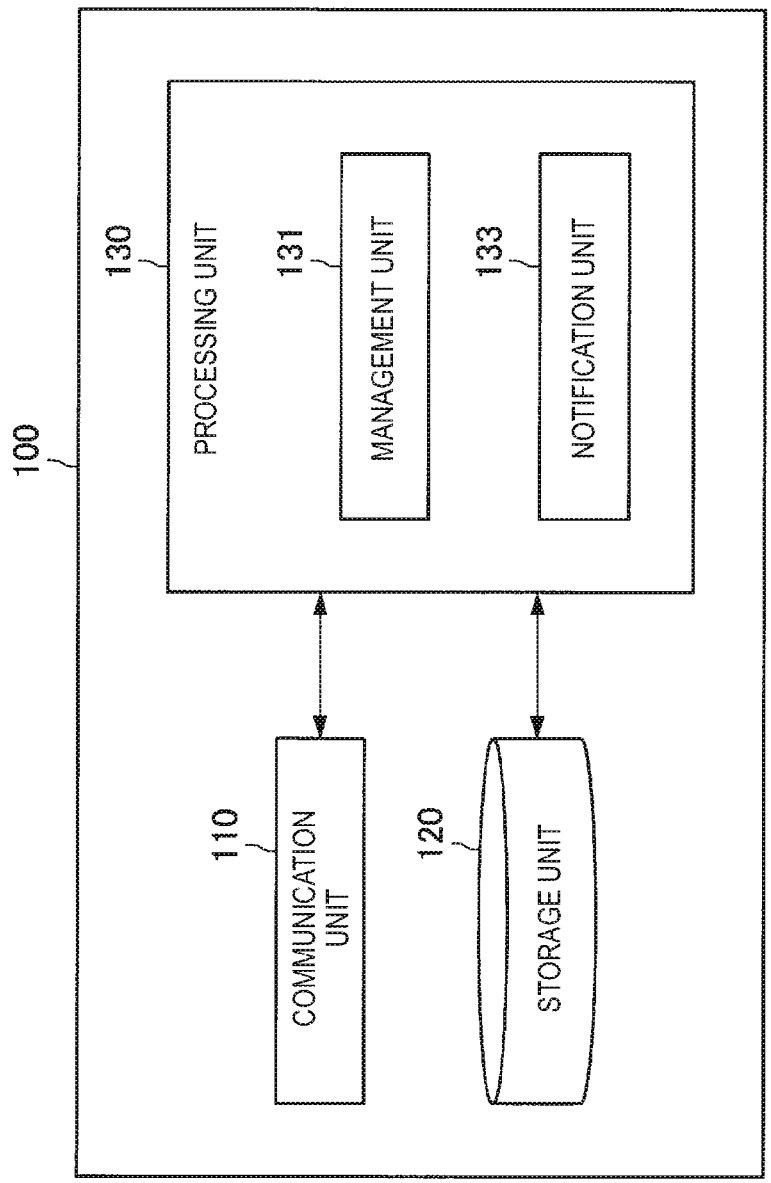
FIG. 2 is a block diagram illustrating an example of a configuration of a management device according to the same embodiment.

First, a configuration of the management device 100 according to the present embodiment will be described with reference to FIGS. 2 and 3. FIG. 2 is a block diagram illustrating an example of the configuration of the management device 100 according to the present embodiment. Referring to FIG. 2, the management device 100 is provided with a communication unit 110, a storage unit 120, and a processing unit 130.

(Communication Unit 110)

The communication unit 110 communicates with other nodes. For example, the communication unit 110 communicates with the wireless communication terminals 200 via the connection node 10.

(Storage Unit 120)

The storage unit 120 temporarily or permanently stores programs and data for operations of the management device 100.

For example, the storage unit 120 stores a table for managing a direct connection between the wireless communication terminals 200 (hereinafter referred to as a "management table"). Detailed content of the management table will be described below.

(Processing Unit 130)

The processing unit 130 provides various functions of the management device 100. The processing unit 130 includes a management unit 131 and a notification unit 133.

(Management Unit 131)

Issuing Connection IDs

The management unit 131 issues identification information for a direct connection between the two wireless communication terminals 200 (hereinafter referred to as a "connection ID").

For example, the management unit 131 decides to attempt direct connection between the two wireless communication terminals 200. Then, the management unit 131 issues a connection ID for the direct connection. To be more specific, the management unit 131, for example, newly generates a connection ID or selects one connection ID from one or more existing connection IDs that have not been used for issuing the connection ID. Note that the management unit 131, for example, issues a connection ID for each pair of wireless communication terminals that perform a direct connection.

As an example, the direct connection is a direct connection complying with a wireless local area network (LAN) standard. The wireless LAN standard is IEEE 802.11 (for example, IEEE 802.11a, 11b, 11g, 11n, 11ac, 11ad, or the like), Wi-Fi Direct, or the like.

Generating Communication Parameters

For example, the management unit 131 generates communication parameters for a direct connection between the two wireless communication terminals 200.

To be more specific, the communication parameters include, for example, a role in a direct connection, a frequency channel to be used, a service set identifier (SSID), a pre-shared key (a pairwise master key (PMK)), and/or a search start scheduled time.

Note that the role is, for example, a first role that is the role of a master device that awaits a request for a connection or a second role that is the role of a slave device that requests a connection. As an example, when the direct connection is a direct connection of Wi-Fi Direct, the first role is a group owner and the second role is a client. The management unit 131, for example, decides respective roles of the two wireless communication terminals 200. As a result, the role of one wireless communication terminal of the two wireless communication terminals 200 is the first role (for example, a group owner), and the role of the other wireless communication terminal of the two wireless communication terminals 200 is the second role (for example, a client).

Updating a Management Table

The management unit 131, for example, updates a table for managing a direct connection between the wireless communication terminals (i.e., a management table).

The management table includes, for example, connection IDs as an information item. In addition, the management table includes, for example, terminal IDs of the wireless communication terminals 200 (for example, IP addresses, IDs on cellular networks, and the like). The management unit 131, for example, registers connection IDs and terminal IDs in the management table at the time of issuing the connection IDs.

In addition, the management table includes, for example, some or all of the communication parameters. To be more specific, the management table includes, for example, a role in a direct connection and/or a frequency channel to be used. The management unit 131 registers the communication parameters in the management table upon, for example, generating the communication parameters.

In addition, the management table includes, for example, information indicating a status of a direct connection between the wireless communication terminals 200. The management unit 131 updates the information indicating the status when, for example, the status of the direct connection changes.

FIG. 3 is an explanatory diagram for describing an example of the management table. Referring to FIG. 3, the management table is shown. The management table includes, as information items, for example, "connection ID," "terminal ID," "role," "channel," and "connection status." In the management table, the information is registered for each pair of wireless communication terminals that perform a direct connection.

Note that, when a direct connection between the wireless communication terminals 200 is terminated, for example, the management unit 131 deletes the information relating to the direct connection (a connection ID, terminal ID, and the like) from the management table. That is, when the direct connection is terminated, the management unit 131 erases the registration of the connection ID. Accordingly, for example, the registration of the connection ID can be synchronized with the direct connection. The wireless communication terminals 200, for example, notify the management device 100 of the termination of the direct connection.

In addition, the management unit 131 may further manage an amount of data transmitted or received between the wireless communication terminals 200. The amount of data may be, for example, stored (for example, in the storage unit 250) in association with the connection ID for the direct connection between the wireless communication terminals 200. In addition, the wireless communication terminals 200 may notify the management device 100 of the amount of data.

(Notification Unit 133)

Notification of a Connection ID

The notification unit 133 notifies the two wireless communication terminals 200 of the connection ID (i.e., identification information for the direct connection between the two wireless communication terminals 200).

When the connection ID is generated, for example, the notification unit 133 notifies the two wireless communication terminals 200 of the connection ID. To be more specific, the notification unit 133, for example, notifies the two wireless communication terminals 200 of a connection request (Connect Request) including the connection ID via the communication unit 110.

Notification of Communication Parameters

The notification unit 133, for example, notifies the two wireless communication terminals 200 of the communication parameters for the direct connection between the two wireless communication terminals 200.

When the communication parameters are generated, for example, the notification unit 133 notifies the two wireless communication terminals 200 of the communication parameters. To be more specific, the notification unit 133 notifies the two wireless communication terminals 200 of, for example, a connection request including the communication parameters (and the connection ID) via the communication unit 110.

Due to the notification of the communication parameters, for example, time necessary for the direct connection is shortened. Furthermore, for example, a load imposed on the wireless communication terminals 200 for the direct connection can be reduced.

Request for Disconnection of a Direct Connection

The notification unit 133, for example, requests disconnection of a direct connection between the two wireless communication terminals 200 from at least one of the two wireless communication terminals 200 that are directly connected.

To be more specific, for example, termination of the direct connection between the two wireless communication terminals 200 is decided. Then, the notification unit 133 notifies the two wireless communication terminals 200 of a disconnection request (Disconnect Request) including the connection ID for the direct connection via the communication unit 110.

<2.2. Configuration of a Wireless Communication Terminal>>

Figure 4:
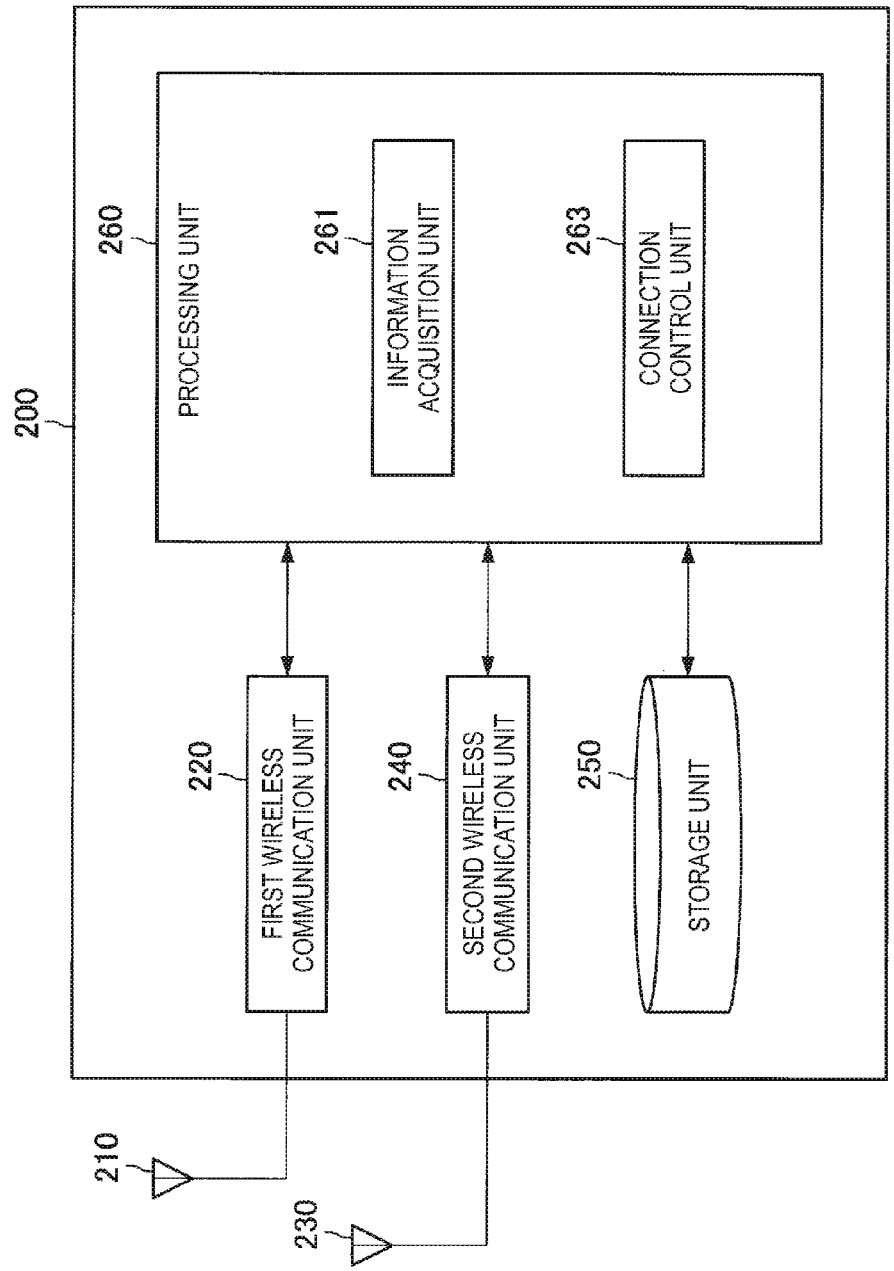
FIG. 4 is a block diagram illustrating an example of a configuration of a wireless communication terminal according to the same embodiment.

Next, a configuration of a wireless communication terminal 200 according to the present embodiment will be described with reference to FIGS. 4 to 9. FIG. 4 is a block diagram illustrating an example of the configuration of the wireless communication terminal 200 according to the present embodiment. Referring to FIG. 4, the wireless communication terminal 200 is provided with a first antenna unit 210, a first wireless communication unit 220, a second antenna unit 230, a second wireless communication unit 240, a storage unit 250, and a processing unit 260.

(First Antenna Unit 210)

The first antenna unit 210 radiates a signal output by the first wireless communication unit 220 as radio waves to a space. In addition, the first antenna unit 210 converts space radio waves into a signal and outputs the signal to the first wireless communication unit 220.

(First Wireless Communication Unit 220)

The first wireless communication unit 220 performs wireless communication. The first wireless communication unit 220 performs, for example, wireless communication with the connection node 10. In other words, the first wireless communication unit 220 receives signals transmitted from the connection node 10, and transmits signals to the connection node 10.

As an example, the connection node 10 is a base station of a cellular network as described above. In this case, the first wireless communication unit 220 is a communication unit for wireless communication that complies with a communication standard of cellular communication.

Note that the first wireless communication unit 220 may perform wireless communication with another wireless communication terminal 200. In other words, the first wireless communication unit 220 may receive signals transmitted from another wireless communication terminal 200, and transmit signals to another wireless communication terminal 200.

(Second Antenna Unit 230)

The second antenna unit 230 radiates a signal output by the second wireless communication unit 240 as radio waves to a space. In addition, the second antenna unit 230 converts space radio waves into a signal and outputs the signal to the second wireless communication unit 240.

(Second Wireless Communication Unit 240)

The second wireless communication unit 240 performs wireless communication. The second wireless communication unit 240, for example, performs wireless communication within a shorter distance than wireless communication of the first wireless communication unit 220.

The second wireless communication unit 240, for example, performs wireless communication with another wireless communication terminal 200. In other words, the second wireless communication unit 240 receives signals transmitted from another wireless communication terminal 200, and transmits signals to another wireless communication terminal 200.

The second wireless communication unit 240 is, as an example, a communication unit for wireless communication that complies with a wireless LAN standard. Note that, in this case, the second wireless communication unit 240 may perform wireless communication with an access point of the wireless LAN.

(Storage Unit 250)

The storage unit 250 temporarily or perpetually stores programs and data for operations of the wireless communication terminal 200.

For example, the storage unit 250 stores a table in which information relating to a direct connection with another wireless communication terminal 200 is registered (hereinafter referred to as a "connection table"). Detailed content of the connection table will be described below.

(Processing Unit 260)

The processing unit 260 provides various functions of the wireless communication terminal 200. The processing unit 260 includes an information acquisition unit 261 and a connection control unit 263.

(Information Acquisition Unit 261)

Acquisition of a Connection ID

The information acquisition unit 261 acquires identification information for a direct connection between the two wireless communication terminals 200 (i.e., a connection ID). Here, a wireless communication terminal 200 provided with the information acquisition unit 261 is one wireless communication terminal of the two wireless communication terminals 200.

The connection ID is issued by another device that is different from the two wireless communication terminals 200. The other device is the management device 100 as described above. When the management device 100 issues the connection ID, for example, the device notifies the two wireless communication terminals 200 of the connection ID, and each of the two wireless communication terminals 200 receives the connection ID. Then, the connection ID is stored in the storage unit 250. In addition, the information acquisition unit 261 acquires the connection ID from the storage unit 250.

To be more specific, the storage unit 250 stores, for example, the table in which information relating to a direct connection is registered (i.e., the connection table), and the connection ID is registered in the connection table. Note that the registration in the connection table is performed by, for example, the processing unit 260.

Connection Table

The information to be registered in the connection table differs depending on, for example, the roles of the wireless communication terminals 200 in a direct connection. To be more specific, for example, the role of one wireless communication terminal 200 of the two wireless communication terminals 200 is the first role, and the role of the other wireless communication terminal 200 of the two wireless communication terminals 200 is the second role. Then, the information to be registered in the connection table differs depending on whether the role of a wireless communication terminal 200 storing the connection table is the first role or the second role.

Case of the First Role

The first role is, for example, the role of a master device that awaits a request for a connection, which is a group owner as an example. A specific example of the information to be registered in the connection table when the role of a wireless communication terminal 200 is the first role will be described below with reference to FIG. 5.

FIG. 5 is an explanatory diagram for describing a first example of the information to be registered in a connection table when the role of a wireless communication terminal 200 is the first role. Referring to FIG. 5, the connection table that includes "connection ID," "MAC address," "ID verification status," and "connection reception information (connection reception status)" as information items is shown. The "connection ID" is a connection ID notified of by the management device 100. The "MAC address" is a MAC address of another wireless communication terminal 200 to which the wireless communication terminal 200 is directly connected using a connection ID. The "ID verification status" indicates whether verification using a connection ID is valid or invalid. The "connection reception status" indicates whether to admit or reject a direct connection by another wireless communication terminal 200. For example, when the management device 100 issues a connection ID and notifies the wireless communication terminal 200 of the connection ID, the connection ID is registered as the information item "connection ID" of the connection table. In addition, at that point, as the information item "MAC address," for example, no MAC address is registered. In addition, as the information item "ID verification status," "valid" is registered. In addition, as the information item "connection reception status," "reject" is registered.

Case of the Second Role

The second role is, for example, the role of a slave device requesting a connection, and is a client as an example. A specific example of the information to be registered in the connection table when the role of a wireless communication terminal 200 is the second role will be described below with reference to FIG. 6.

FIG. 6 is an explanatory diagram for describing a first example of the information to be registered in a connection table when the role of a wireless communication terminal 200 is the second role. Referring to FIG. 6, the connection table that includes similar information items to those in the example of FIG. 5 is shown. When, for example, the management device 100 issues a connection ID and notifies the wireless communication terminal 200 of the connection ID, the connection ID is registered as the information item "connection ID" of the connection table. In addition, at that point, as the information item "MAC address," for example, no MAC address is registered. Note that, when the role of the wireless communication terminal 200 is the second role, no information is registered as the information items "ID verification status" and "connection reception information" of the connection table. Note that, as the information items "ID verification status" and "connection reception information," any provisional values may be registered.

Acquisition of Communication Parameters

The information acquisition unit 261, for example, acquires communication parameters for a direct connection between the two or more wireless communication terminals.

To be more specific, when the management device 100 generates the communication parameters, for example, the device notifies the two wireless communication terminals 200 of the communication parameters, and each of the two wireless communication terminals 200 receives the communication parameters. Then, the communication parameters are stored in the storage unit 250. Then, the information acquisition unit 261 acquires the communication parameters from the storage unit 250.

Note that the communication parameters include the role in a direct connection as described above. Thus, a wireless communication terminal 200 performs the operation of the role (for example, the first role or the second role) based on the role of the wireless communication terminal 200 included in the communication parameters. In addition, the wireless communication terminal 200 registers information according to the role (for example, the first role or the second role) in the connection table as described above.

(Connection Control Unit 263)

Control for a Direct Connection

The connection control unit 263 performs control for the direct connection between the two wireless communication terminals 200 (hereinafter referred to as "connection control") using the connection ID. Here, a wireless communication terminal 200 provided with the connection control unit 263 is one wireless communication terminal of the two wireless communication terminals 200.

The direct connection is, for example, a connection for wireless communication (for example, wireless communication that complies with a wireless LAN standard) performed by the wireless communication terminal 200 using the second wireless communication unit 240. Note that the direct connection may be a connection for wireless communication (for example, wireless communication that complies with a cellular communication standard) performed by the wireless communication terminal 200 using the first wireless communication unit 220.

Note that the connection control differs depending on, for example, the role of the wireless communication terminal 200 (provided with the connection control unit 263).

Case of the First Role

When the role of the wireless communication terminal 200 is the first role (that is, the role of a master device that awaits a request for a connection), the connection control includes, for example, the following specific control.

Authentication

The connection control includes authentication of another wireless communication terminal 200 that tries direct connection with the wireless communication terminal 200. That is, the connection control unit 263 performs authentication of another wireless communication terminal 200 that tries direct connection with the wireless communication terminal 200 using the connection ID. As described above, the wireless communication terminal 200 is one wireless communication terminal 200 of the two wireless communication terminals 200, and the authentication is to verify whether the other wireless communication terminal 200 is the other wireless communication terminal 200 of the two wireless communication terminals 200.

The authentication includes, for example, verifying whether information provided by the other wireless communication terminal 200 is information corresponding to the connection ID. The information corresponding to the connection ID is, for example, information conforming to the connection ID.

To be more specific, for example, the management device 100 notifies the two wireless communication terminals 200 of the same connection ID, and the wireless communication terminal 200 (i.e., one wireless communication terminal 200 of the two wireless communication terminals 200) acquires the connection ID and stores the ID in the storage unit 250. In addition, the other wireless communication terminal 200 trying direct connection with the wireless communication terminals 200 provides information to the wireless communication terminal 200. As an example, the wireless communication terminal 200 starts transmission of a beacon earlier than a search start scheduled time that is one of the communication parameters described above, and the other wireless communication terminal 200 transmits a probe request including the information and an SSID after the search start scheduled time according to reception of the beacon. Note that the beacon includes, for example, no SSID. Then, the information acquisition unit 261 acquires an SSID that is one of the communication parameters, and the connection control unit 263 verifies whether the SSID coincides with the SSID included in the probe request. Further, the information acquisition unit 261 acquires the connection ID from the storage unit 250 (the connection table), and the connection control unit 263 verifies whether the information provided by the other wireless communication terminal 200 coincides with the connection ID. Then, it is assumed that the SSID that is one of the communication parameters coincides with the SSID included in the probe request, and the information coincides with the connection ID. In this case, it can be ascertained that the other wireless communication terminal 200 is the wireless communication terminal 200 provided with the connection ID from the management device 100 (that is, the other wireless communication terminal 200 of the two wireless communication terminals 200). For this reason, if the information coincides with the connection ID, for example, the authentication can succeed. On the other hand, if the information does not coincide with the connection ID, the authentication fails. Note that, when two or more connection IDs are registered in the connection management table, with which of the two or more connection IDs the information provided by the other wireless communication terminal 200 coincides is verified. Then, if the information coincides with any one of the connection IDs, the authentication can succeed. On the other hand, if the information coincides with none of the connection IDs, the authentication fails.

The authentication is performed using the connection ID as described above. Accordingly, the wireless communication terminal 200, for example, can admit a direct connection with an intended wireless communication terminal 200 and prevent a direct connection with an unintended wireless communication terminal 200.

In addition, the connection control unit 263 performs, for example, authentication of another wireless communication terminal 200 trying direct connection with the wireless communication terminal 200 using the connection ID as described above. Then, the authentication succeeds only when an availability condition of the connection ID is satisfied. As an example, the availability condition is that authentication using the connection ID has not succeeded yet. That is, the authentication can succeed when authentication using the connection ID has not succeeded yet, but fails when authentication using the connection ID has already succeeded.

To be more specific, the connection control unit 263, for example, verifies whether the information provided by the other wireless communication terminal 200 coincides with the connection ID and, for example, ascertains that the information coincides with the connection ID as described above. In this case, the connection control unit 263 checks the "ID verification status" corresponding to the connection ID included in the connection table. As a result, if the "ID verification status" is "valid," the authentication of the other wireless communication terminal 200 succeeds. Then, when the authentication succeeds, the connection control unit 263 updates the connection table. A specific example of the update of the connection table will be described below with reference to FIG. 7.

FIG. 7 is an explanatory diagram for describing a second example of the information to be registered in the connection table when the role of the wireless communication terminal 200 is the first role. Referring to FIG. 7, the connection table that includes similar information items to those in the example of FIG. 5 is shown. If authentication succeeds, the connection table illustrated in FIG. 5 is updated to, for example, the connection table illustrated in FIG. 7. To be more specific, the connection control unit 263 registers a MAC address of the other wireless communication terminal 200 as the information item "MAC address" of the connection table. Further, the connection control unit 263 changes, for example, "valid" registered as the information item "ID verification status" of the connection table to "invalid." That is, if information coinciding with a connection ID is provided, "invalid" is registered as the "ID verification status." In addition, the connection control unit 263 changes "reject" registered as the information item "connection reception status" of the connection table to "admit." That is, if authentication succeeds, "admit" is registered as the "connection reception status."

On the other hand, the connection control unit 263 checks the "ID verification status" of the connection table corresponding to the connection ID, and as a result, for example, ascertains that the "ID verification status" is "invalid." In this case, the authentication of the other wireless communication terminal 200 fails. That is, when authentication using the connection ID has already succeeded, even if information coinciding with the connection ID is further provided, the authentication fails.

Therefore, if a connection ID is intercepted when the connection ID is provided to the wireless communication terminal 200 by another wireless communication terminal 200, for example, a succeeding direct connection to the wireless communication terminal 200 using the connection ID is not admitted. Thus, for example, an unauthorized direct connection to the wireless communication terminal 200 can be prevented.

Admission or Rejection of a Connection

The connection control includes admitting or rejecting a direct connection to a wireless communication terminal 200 by another wireless communication terminal 200.

First, when authentication of another wireless communication terminal 200 trying a direct connection with the wireless communication terminal 200 fails, the connection control unit 263 rejects the direct connection by the other wireless communication terminal 200.

To be more specific, when the authentication fails, for example, the MAC address of the other wireless communication terminal 200 is not registered as the information item "MAC address" of the connection table as illustrated in, for example, FIG. 5. Thus, even when the other wireless communication terminal 200 requests a connection from the connection control unit 263, if the MAC address of the other wireless communication terminal 200 is not registered in the connection table, the direct connection by the other wireless communication terminal 200 is rejected.

Second, when the authentication succeeds, for example, the connection control unit 263 can admit the direct connection by the other wireless communication terminal 200. When the authentication succeeds, for example, the connection control unit 263 admits the direct connection by the other wireless communication terminal 200 in a limited period of time, and rejects the direct connection by the other wireless communication terminal 200 in a period other than the limited period of time. Note that "rejecting a direct connection" here does not mean stopping a direct connection that has already been established, but means rejecting a new direct connection.

To be more specific, the limited period of time is, for example, a period of time taken until data communication between the wireless communication terminal 200 and the other wireless communication terminal 200 is possible. In other words, the connection control unit 263 admits the direct connection in the period of time taken until the data communication is possible, and rejects the direct connection after the data communication is possible.

The authentication of, for example, the other wireless communication terminal 200 trying direct connection with the wireless communication terminal 200 succeeds, and the other wireless communication terminal 200 requests a connection with the wireless communication terminal 200. As an example, the other wireless communication terminal 200 transmits an association request to the wireless communication terminal 200. Then, the connection control unit 263 checks whether the MAC address of the other wireless communication terminal 200 that transmitted the association request is registered in the connection table. If the MAC address is registered in the connection table, the connection control unit 263 checks the "connection reception status" that corresponds to the MAC address of the connection table. If "admit" is registered as the "connection reception status" as illustrated in FIG. 7, for example, the connection control unit 263 admits the direct connection to the wireless communication terminal 200 by the other wireless communication terminal 200. Then, the wireless communication terminal 200 transmits an association response indicating success to the other wireless communication terminal 200. Thereafter, using a pre-shared key (PMK) that is one of the communication parameters described above, for example, a 4-way handshake is performed between the wireless communication terminal 200 and the other wireless communication terminal 200. As a result, a data path of a network layer between the wireless communication terminal 200 and the other wireless communication terminal 200 is opened, and thus data communication between the wireless communication terminal 200 and the other wireless communication terminal 200 is possible. Then, the connection control unit 263 changes the "connection reception status" of the connection table from "admit" to "reject" as illustrated in, for example, FIG. 8. On the other hand, if the MAC address is not registered in the connection table, or if "reject" is registered as the "connection reception status" that corresponds to the MAC address, the connection control unit 263 rejects a direct connection to the wireless communication terminal 200 by the other wireless communication terminal 200. Since "admit" is registered as the "connection reception status" in that manner until data communication between the wireless communication terminal 200 and the other wireless communication terminal 200 is possible, the direct connection between the wireless communication terminal 200 and the other wireless communication terminal 200 is admitted. On the other hand, after the data communication is possible, "reject" is registered as the "connection reception status," and thus a direct connection is rejected.

As described above, a direct connection is admitted only in the limited period of time. Accordingly, for example, the direct connection to the wireless communication terminal 200 by the other wireless communication terminal 200 is limited, and thus an unauthorized direct connection to the wireless communication terminal 200 can be prevented.

Furthermore, the limited period of time is, for example, a period of time taken until the data communication is possible as described above. Accordingly, while data communication between the wireless communication terminal 200 and the other wireless communication terminal 200 is ensured, a period of time in which, for example, an unauthorized direct connection can be performed thereafter can be extremely shortened.

Case of the Second Role

On the other hand, when the role of the wireless communication terminal 200 is the second role (i.e., the role of a slave device that requests a connection), the connection control includes, for example, the following specific control.

Provision of a Connection ID

The connection control includes providing the connection ID to the other wireless communication terminal 200 among the two wireless communication terminals 200.

To be more specific, the management device 100, for example, notifies the two wireless communication terminals 200 of the same connection ID, and the wireless communication terminal 200 (i.e., the one wireless communication terminal 200 of the two wireless communication terminals 200) acquires the connection ID, and stores the ID in the storage unit 250. Thereafter, the information acquisition unit 261 acquires the connection ID from the storage unit 250, and the connection control unit 263 provides the connection ID to the other wireless communication terminal 200 of the two wireless communication terminals 200. As an example, the wireless communication terminal 200 transmits a probe request that includes an SSID that is one of the communication parameters described above and the connection ID after a search start scheduled time that is one of the communication parameters according to reception of a beacon (that does not include an SSID). Thereafter, the other wireless communication terminal 200 of the two wireless communication terminals 200 performs authentication of the wireless communication terminal 200 using the connection ID.

Thereby, for example, the other wireless communication terminal 200 of the two wireless communication terminals 200 can admit a direct connection with an intended wireless communication terminal 200, and prevent a direct connection with an unintended wireless communication terminal 200.

Note that, if authentication of the wireless communication terminal 200 succeeds, for example, a message including the connection ID is transmitted to the wireless communication terminal 200 from the other wireless communication terminal 200 of the two wireless communication terminals 200. The message is a probe response as an example. Then, the connection control unit 263 updates the connection table. To be more specific, for example, the connection control unit 263 registers the MAC address of the other wireless communication terminal 200 of the two wireless communication terminals 200 as the information item "MAC address" of the connection table as illustrated in FIG. 9.

Disconnection of a Direct Connection

The connection control unit 263 disconnects a direct connection between the two wireless communication terminals 200 (i.e., the wireless communication terminal 200 and the other wireless communication terminal 200).

For example, the connection control unit 263 disconnects the direct connection by performing a disconnection procedure for the direct connection. The disconnection procedure includes, for example, transmission of a deauthentication frame.

First Example

As a first example, the connection control unit 263 disconnects the direct connection according to a request for a disconnection from the management device 100.

The management device 100 requests disconnection of the direct connection between the two wireless communication terminals 200 (i.e., the wireless communication terminal 200 and the other wireless communication terminal 200) from the wireless communication terminal 200. To be more specific, the management device 100, for example, notifies the wireless communication terminal 200 of a disconnection request (Disconnect Request) including the connection ID for the direct connection. Then, the connection control unit 263 specifies the direct connection from the connection ID and the connection table, and performs the disconnection procedure for the direct connection. As a result, the direct connection is disconnected.

Accordingly, the management device 100 can disconnect the direct connection between the two wireless communication terminals 200, for example, as necessary. Thus, the management device 100 can, for example, control the direct connection more freely and more thoroughly.

Second Example

As a second example, the connection control unit 263 disconnects the direct connection when a connection with the management device 100 is disconnected.

When disconnection of a connection between the wireless communication terminal 200 and the management device 100 is detected, for example, the connection control unit 263 performs the disconnection procedure for the direct connection between the two wireless communication terminals 200 (i.e., the wireless communication terminal 200 and the other wireless communication terminal 200). As a result, the direct connection is disconnected.

Accordingly, it is possible to disconnect, for example, the direct connection of a wireless communication terminal 200 with which the management device 100 is not able to communicate. Thus, for example, it is possible to prevent a direct connection of a wireless communication terminal 200 that is outside of control of the management device 100.

Third Example

As a third example, when communication between the two wireless communication terminals 200 is not being performed for a predetermined period of time or longer, the connection control unit 263 disconnects the direct connection.

For example, when it is detected that communication between the two wireless communication terminals 200 (i.e., the wireless communication terminal 200 and the other wireless communication terminal 200) is not performed for the predetermined period of time or longer, the connection control unit 263 performs the disconnection procedure for the direct connection between the two wireless communication terminals 200. As a result, the direct connection is disconnected.

Accordingly, after the direct connection between the wireless communication terminals 200 is unnecessary, for example, it is possible to quickly disconnect the direct connection.

The connection control unit 263 disconnects the direct connection between the two wireless communication terminals 200 as described above. Note that, when the direct connection between the wireless communication terminals 200 is terminated, the connection control unit 263 deletes, for example, information relating to the direct connection (the connection ID, the MAC address, and the like) from the connection table. Thus, even if an unauthorized direct connection is attempted using the connection ID, for example, after the direct connection ends, the unauthorized direct connection is not admitted.

Notification of Establishment and Disconnection of a Direct Connection

The connection control unit 263, for example, notifies the management device 100 of establishment of a direct connection between the two wireless communication terminals 200 (i.e., the wireless communication terminal 200 and the other wireless communication terminal 200). When the direct connection is established, for example, the connection control unit 263 notifies the management device 100 of a connection response including the connection ID for the direct connection.

In addition, the connection control unit 263 notifies the management device 100 of, for example, disconnection of a direct connection between the two wireless communication terminals 200 (i.e., the wireless communication terminal 200 and the other wireless communication terminal 200). For example, the connection control unit 263 notifies the management device 100 of a disconnection response (Disconnect Response) or a disconnection indication (Disconnect Indication) including the connection ID for the direct connection.

Thereby, the management device 100 can manage a status of a direct connection between the two wireless communication terminals 200.

Note that the connection control unit 263 may notify the management device 100 of failure of establishment of a direct connection between the two wireless communication terminals 200 (i.e., the wireless communication terminal 200 and the other wireless communication terminal 200). When establishment of the direct connection fails, for example, the connection control unit 263 may notify the management device 100 of a connection response which is a connection response including the connection ID for the direct connection indicating the failure of the direct connection.

In addition, the connection control unit 263 may notify the management device 100 of the amount of data exchanged between the two wireless communication terminals 200. For example, the connection control unit 263 may notify the management device 100 of the connection ID of the direct connection between the two wireless communication terminals 200 and the amount of the data.

3. Process Flows

Next, examples of processes according to the present embodiment will be described with reference to FIGS. 10A to 13.

<3.1. Flow of a Connection Process>

First, an example of a connection process according to the present embodiment will be described with reference to FIGS. 10A and 10B. FIGS. 10A and 10B are sequence diagrams illustrating an example of a schematic flow of the connection process according to the present embodiment.

The management device 100 decides to attempt direct connection between two wireless communication terminals 200 (i.e., a wireless communication terminal 200A and a wireless communication terminal 200B), and issues a connection ID for the direct connection (S401). The connection ID is registered in a management table as illustrated in, for example, FIG. 3.

In addition, the management unit 131 generates communication parameters for the direct connection (S403). The communication parameters include, for example, roles in the direct connection, and roles of the two respective wireless communication terminals 200 are decided. In this example, the role of the wireless communication terminal 200A is a group owner, and the role of the wireless communication terminal 200B is a client. Note that the communication parameters are registered in the management table as illustrated in, for example, FIG. 3.

Then, the management device 100 transmits a connection request (Connect Request) including the connection ID and the communication parameters to the two wireless communication terminals 200 (S405 and S407).

Thereafter, the wireless communication terminal 200A updates a connection table of the wireless communication terminal 200A as illustrated in, for example, FIG. 5 (S409). Then, the wireless communication terminal 200A starts an operation as a group owner (S411). Note that the wireless communication terminal 200A starts transmission of a beacon before a search start scheduled time that is one of the communication parameters. Note that the beacon includes, for example, no SSID.

In addition, the wireless communication terminal 200B updates a connection table of the wireless communication terminal 200B as illustrated in, for example, FIG. 6 (S413). Then, the wireless communication terminal 200B starts an operation as a client (S415).

The wireless communication terminal 200B transmits a probe request including an SSID that is one of the communication parameters and the connection ID according to the reception of the beacon after the search start scheduled time (S417).

Then, the wireless communication terminal 200A verifies whether the connection ID provided by the wireless communication terminal 200B coincides with the connection ID included in the connection table of the wireless communication terminal 200A (S419). As a result, it is ascertained that the provided connection ID coincides with the connection ID included in the connection table. In addition, the wireless communication terminal 200A checks the "ID verification status" included in the connection table that corresponds to the connection ID (S421). As a result, it is ascertained that the "ID verification status" is "valid." In this case, authentication of the wireless communication terminal 200B succeeds. Then, the wireless communication terminal 200A updates the connection table of the wireless communication terminal 200A as illustrated in, for example, FIG. 7 (S423). Note that, if the provided connection ID does not coincide with the connection ID included in the connection table, and if the "ID verification status" corresponding to the connection ID is "invalid," authentication fails.

Thereafter, the wireless communication terminal 200A transmits a probe response including the connection ID (S425). Then, the wireless communication terminal 200B updates the connection table of the wireless communication terminal 200B as illustrated in, for example, FIG. 9 (S427).

Further, the wireless communication terminal 200B transmits an association request to the wireless communication terminal 200A (S431).

Then, the wireless communication terminal 200A checks that a MAC address of the wireless communication terminal 200B that transmitted the association request is registered in the connection table of the wireless communication terminal 200A (S433). As a result, it is ascertained that the MAC address is registered in the connection table. In addition, the wireless communication terminal 200A checks the "connection reception status" included in the connection table that corresponds to the MAC address (S435). As a result, it is ascertained that "admit" is registered as the "connection reception status." In this case, the wireless communication terminal 200A admits a direct connection of the wireless communication terminal 200B to the wireless communication terminal 200A. Note that, if the MAC address is not registered in the connection table of the wireless communication terminal 200A, and if the "connection reception status" corresponding to the MAC address is "reject," the wireless communication terminal 200A rejects the direct connection to the wireless communication terminal 200A.

Thereafter, the wireless communication terminal 200A transmits an association response indicating success (S437). In addition, the wireless communication terminal 200A and the wireless communication terminal 200B perform a 4-way handshake using a pre-shared key (PMK) that is one of the communication parameters (S439). As a result, a data path between the wireless communication terminal 200A and the wireless communication terminal 200B is opened, and data communication between the wireless communication terminal 200A and the wireless communication terminal 200B is possible. Further, the wireless communication terminal 200A updates the connection table of the wireless communication terminal 200A as illustrated in, for example, FIG. 8 (S441).

Then, the wireless communication terminal 200A and the wireless communication terminal 200B transmit connection responses (Connect Response) indicating success in establishment of the direct connection to the management device 100 (S443 and S445). The connection responses include the connection ID. Then, the management device 100 updates the management table (S447). Specifically, the management device 100 updates the "connection status" of the management table from "not connected" to "connected."

Note that, when the establishment of the direct connection between the wireless communication terminal 200A and the wireless communication terminal 200B fails, the wireless communication terminal 200A and the wireless communication terminal 200B may transmit connection responses indicating the failure to establish the direct connection to the management device 100. The connection responses may include the connection ID. Then, the management device 100 may delete the information relating to the direct connection (the connection ID, the MAC address, and the like) from the connection table.

<3.2. Flow of a Termination Process>

Next, examples of first to third termination processes according to the present embodiment will be described with reference to FIGS. 11 to 13.

First Example

FIG. 11 is a sequence diagram showing an example of a schematic flow of the first termination process according to the present embodiment. The first termination process is a termination process performed according to a disconnection request from the management device 100.

The management device 100 decides to terminate a direct connection between two wireless communication terminals 200 (i.e., the wireless communication terminal 200A and the wireless communication terminal 200B) (S501). Then, the management device 100 updates the management table (S503). To be more specific, the management device 100 updates the "connection status" of the management table from "connected" to "trying disconnection." Then, the management device 100 transmits a disconnection request (Disconnect Request) including a connection ID for the direct connection to the two wireless communication terminals 200 (S505 and S507).

Thereafter, the two wireless communication terminals 200 (i.e., the wireless communication terminal 200A and the wireless communication terminal 200B) perform a disconnection procedure for the direct connection (S509). The disconnection procedure includes, for example, transmission of a deauthentication frame from one to the other of the two wireless communication terminals 200. As a result, the direct connection is disconnected and terminated. Thereafter, the wireless communication terminal 200A terminates the operation as a group owner (S511).

In addition, the two wireless communication terminals 200 transmit disconnection responses including the connection ID to the management device 100 (S513 and S515). Then, the management device 100 deletes information relating to the direct connection (the connection ID, terminal IDs, and the like) from the management table (S517). In addition, the two wireless communication terminals 200 also delete information relating to the direct connection (the connection ID, the MAC address, and the like) from the connection tables (S519 and S521).

Note that the disconnection request may be transmitted to only one of the wireless communication terminal 200A and the wireless communication terminal 200B.

Second Example

FIG. 12 is a sequence diagram showing an example of a schematic flow of the second termination process according to the present embodiment. The second termination process is a termination process performed according to disconnection of a connection between the management device 100 and a wireless communication terminal 200.

Note that Steps S533 to S545 of the second termination process illustrated in FIG. 12 are the same as Steps S509 to S521 of the first termination process described referring to FIG. 11. Thus, only Step S531 will be described here.

The wireless communication terminal 200A detects the disconnection of the connection between the wireless communication terminal 200A and the management device 100 (S531). Thereafter, the disconnection procedure (S533) and the like are performed.

Note that, instead of the wireless communication terminal 200A or along with the wireless communication terminal 200A, the wireless communication terminal 200B may detect disconnection of a connection between the wireless communication terminal 200B and the management device 100.

Third Example

Figure 13:
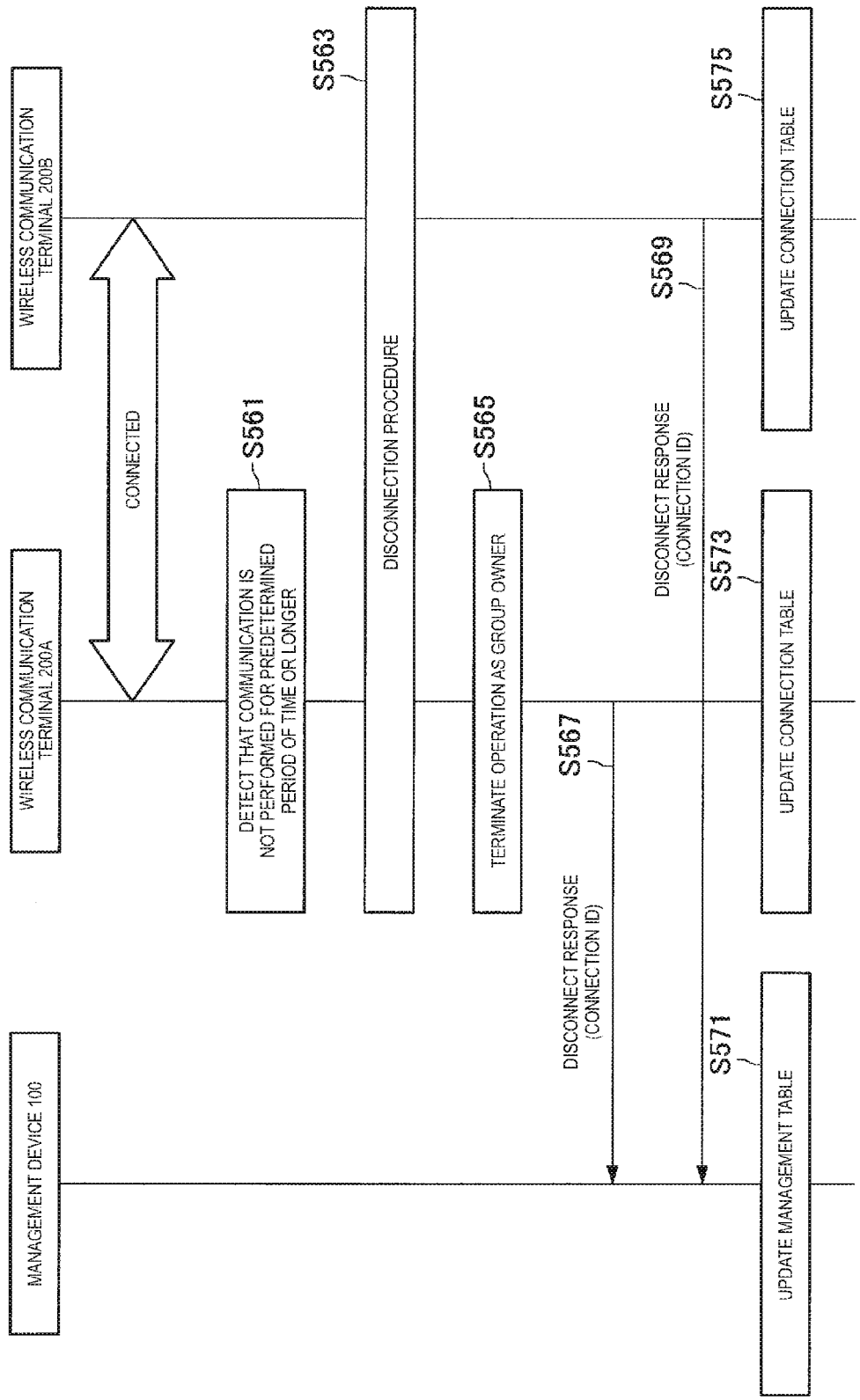
FIG. 13 is a sequence diagram illustrating an example of a schematic flow of a third termination process according to the same embodiment.

FIG. 13 is a sequence diagram showing an example of a schematic process of the third termination process according to the present embodiment. The third termination process is a termination process performed according to the fact that wireless communication is not performed for a predetermined period of time or longer.

Note that Steps S563 to S575 of the third termination process illustrated in FIG. 13 are the same as Steps S509 to S521 of the first termination process described referring to FIG. 11. Thus, only Step S561 will be described here.

The wireless communication terminal 200A detects that communication between the wireless communication terminal 200A and the wireless communication terminal 200B is not performed for the predetermined period of time or longer (S561). Thereafter, the disconnection procedure (S563) and the like are performed.

Note that, instead of the wireless communication terminal 200A or along with the wireless communication terminal 200A, the wireless communication terminal 200B may detect that communication between the wireless communication terminal 200A and the wireless communication terminal 200B is not performed for a predetermined period of time or longer.

4. Modified Example

Figure 14:
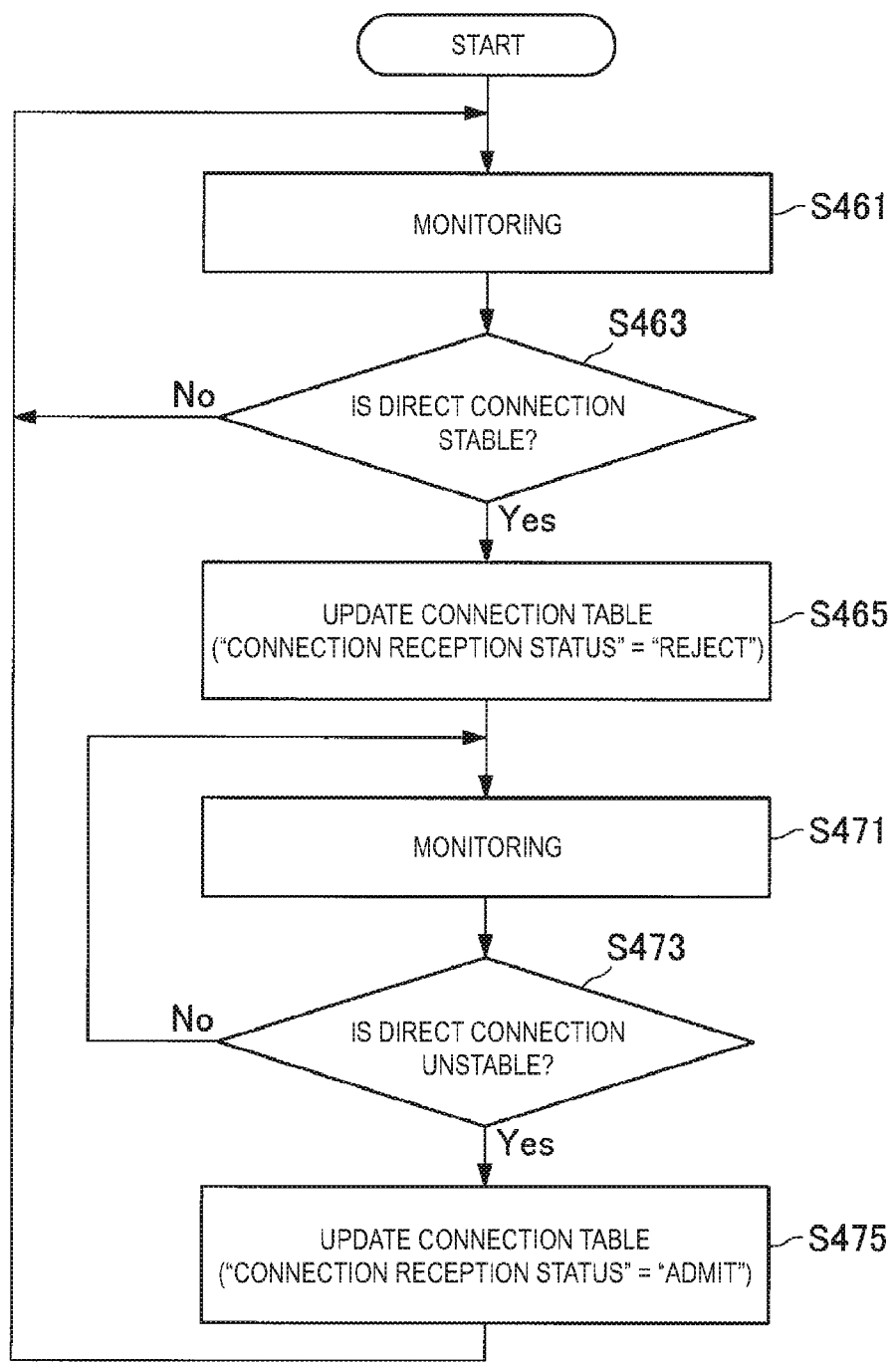
FIG. 14 is a flowchart showing an example of a schematic flow of a process of a wireless communication terminal according to a modified example.

Next, a modified example according to the present embodiment will be described with reference to FIG. 14.

In the present embodiment, when the wireless communication terminal 200 succeeds in authentication of the other wireless communication terminal 200, for example, the terminal admits the direct connection by the other wireless communication terminal 200 in a limited period of time, and rejects the direct connection by the other wireless communication terminal 200 in a period other than the limited period of time. In addition, the limited period of time is, for example, a period of time taken until the data communication between the wireless communication terminal 200 and the other wireless communication terminal 200 is possible as described above.

On the other hand, in the modified example of the present embodiment, the limited period of time is not limited to the period of time take until the data communication is possible, and includes another period of time.

<4.1. Configuration of a Wireless Communication Terminal>
(Connection Control Unit 263)
  Control for a Direct Connection
  Case of a First Role
  Admission or Rejection of a Connection When the authentication succeeds, for example, the connection control unit 263 admits the direct connection by the other wireless communication terminal 200 in the limited period of time, and rejects the direct connection by the other wireless communication terminal 200 in a period other than the limited period of time as described above.

According to the modified example of the present embodiment, the limited period of time includes, as a first example, a period of time taken until a direct connection between the wireless communication terminal 200 and the other wireless communication terminal 200 becomes stable. That is, the connection control unit 263 admits the direct connection in the period of time until the direct connection is determined to be stable, and rejects the direct connection after the direct connection is determined to be stable.

For example, the connection control unit 263 does not update the connection table of the wireless communication terminal 200 after a data path of a network layer between the wireless communication terminal 200 and the other wireless communication terminal 200 is opened, for example. That is, the "connection reception status" of the connection table is not changed from "admit" to "reject." Thereafter, the "connection reception status" is maintained as "admit" until a direct connection between the wireless communication terminal 200 and the other wireless communication terminal 200 is determined to be stable. In addition, when the direct connection is determined to be stable, the connection control unit 263 changes the "connection reception status" of the connection table from "admit" to "reject."

The determination of whether the direct connection is stable is made by, for example, the processing unit 260. To be specific, the processing unit 260, for example, monitors a situation of the direct connection and determines whether the direct connection is stable based on the situation. The situation of the direct connection includes, for example, a frequency of a disconnection and/or a re-connection. Note that the processing unit 260 may monitor communication quality of the direct connection and determine whether the direct connection is stable based on the communication quality (and the situation of the direct connection). The communication quality of the direct connection may include, for example, the intensity of a received signal, a used modulation and coding scheme, and/or a re-transmission occurrence probability.

Due to such a limited period of time, even when a direct connection is not stable and the direct connection is temporarily disconnected, for example, it is possible to quickly re-establish a direct connection without performing the series of procedures for the direct connection again from the beginning until the connection becomes stable.

In addition, according to the modified example of the present embodiment, the limited period of time includes, as a second example, a period after a direct connection between the wireless communication terminal 200 and the other wireless communication terminal 200 is determined to be unstable. That is, the connection control unit 263 admits the direct connection in a period of time after the direct connection is determined to be unstable.

If a direct connection between the wireless communication terminal 200 and the other wireless communication terminal 200 is determined to be unstable, for example, the connection control unit 263 changes the "connection reception status" of the connection table of the wireless communication terminal 200 from "reject" to "admit." In addition, if the direct connection is determined to be stable thereafter, for example, the connection control unit 263 changes the "connection reception status" of the connection table of the wireless communication terminal 200 from "admit" to "reject." Note that the determination of whether the direct connection is unstable is made by, for example, the processing unit 260.

Due to such a limited period of time, even when a direct connection becomes unstable at any timing and thus the direct connection is temporarily disconnected, it is possible to quickly re-establish a direct connection without performing the series of procedures for the direct connection again from the beginning.

<4.2. Process Flow>
(Flow of a Connection Process)

A schematic flow of a connection process according to the modified example of the present embodiment is the same as the schematic flow of the connection process according to the present embodiment described with reference to FIGS. 10A and 10B except for, for example, the following points.

The connection process according to the modified example of the present embodiment does not include Step S441 illustrated in FIG. 10B. That is, in the connection process according to the modified example of the present embodiment, the connection table of the wireless communication terminal 200A is not updated after data communication between the wireless communication terminal 200A and the wireless communication terminal 200B is possible. To be more specific, the wireless communication terminal 200A maintains the "connection reception status" as "admit" without changing the "connection reception status" of the connection table of the wireless communication terminal 200A from "admit" to "reject."

(Process Flow of a Wireless Communication Terminal)

An example of a process of a wireless communication terminal according to the modified example of the present embodiment will be described with reference to FIG. 14. FIG. 14 is a flowchart showing an example of a schematic flow of the process of the wireless communication terminal according to the modified example of the present embodiment. Note that the process is performed by a wireless communication terminal 200 (for example, the wireless communication terminal 200A illustrated in FIGS. 10A and 10B) operating in the first role (a group owner) after the connection process according to the modified example of the present embodiment.

The processing unit 260 monitors a situation (and/or communication quality) of a direct connection between the wireless communication terminal 200 and the other wireless communication terminal 200 (S461), and determines whether the direct connection is stable (S463). If the direct connection is determined to be stable (S463: YES), the connection control unit 263 updates the connection table (S465). That is, the connection control unit 263 changes the "connection reception status (Connection Reception Status)" from "admit" to "reject." On the other hand, if the direct connection is determined not to be stable (S463: NO), the process returns to Step S461.

In addition, the processing unit 260 monitors a situation (and/or communication quality) of the direct connection between the wireless communication terminal 200 and the other wireless communication terminal 200 (S471), and determines whether the direct connection is unstable (S473). If the direct connection is determined to be unstable (S473:

YES), the connection control unit 263 updates the connection table (S475). That is, the connection control unit 263 changes the "connection reception status" of the connection table from "reject" to "admit." Then, the process returns to Step S461. On the other hand, if the direct connection is determined not to be unstable (S473: NO), the process returns to Step S471.

5. Application Examples

The technology of the present disclosure is applicable to various products. For example, a management device 100 may be realized as any type of server such as a tower server, a rack server, and a blade server. At least some of constituent elements of the management device 100 may be realized as a module (such as an integrated circuit module including a single die, and a card or a blade that is inserted into a slot of a blade server) mounted on a server.

For example, a wireless communication terminal 200 may be realized as a mobile terminal such as a smartphone, a tablet personal computer (PC), a notebook PC, a portable game terminal, a portable/dongle type mobile router, and a digital camera, or an in-vehicle terminal such as a car navigation device. In addition, the wireless communication terminal 200 may also be realized as a terminal (that is also referred to as a machine type communication (MTC) terminal) that performs machine-to-machine (M2M) communication. Furthermore, at least some of the constituent elements of the wireless communication terminal 200 may be realized as a module (such as an integrated circuit module including a single die) mounted on such terminals.

<5.1. Application Example of the Management Device 100>>

Figure 15:
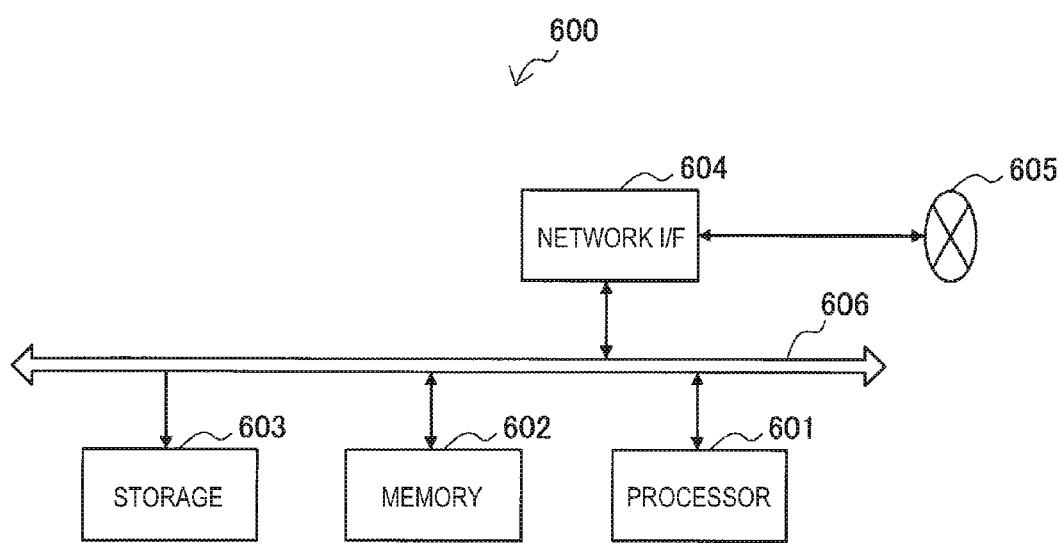
FIG. 15 is a block diagram illustrating an example of a schematic configuration of a server.

FIG. 15 is a block diagram illustrating an example of a schematic configuration of a server 600 to which the technology of the present disclosure may be applied. The server 600 includes a processor 601, a memory 602, a storage 603, a network interface 604, and a bus 606.

The processor 601 may be, for example, a central processing unit (CPU) or a digital signal processor (DSP), and controls various functions of the server 600. The memory 602 includes a random access memory (RAM) and a read only memory (ROM), and stores a program that is executed by the processor 601 and data. The storage 603 may include a storage medium such as a semiconductor memory and a hard disk.

The network interface 604 is a wired communication interface for connecting the server 600 to a wired communication network 605. The wired communication network 605 may be a core network such as an Evolved Packet Core (EPC), or a packet data network (PDN) such as the Internet.

The bus 606 connects the processor 601, the memory 602, the storage 603, and the network interface 604 to each other. The bus 606 may include two or more buses (such as a high speed bus and a low speed bus) each of which has different speed.

In the server 600 illustrated in FIG. 15, the management unit 131 and the notification unit 133 described with reference to FIG. 2 may be implemented in the processor 601. As one example, a program causing the processor to function as the management unit 131 and the notification unit 133 (in other words, a program causing the processor to perform the operations of the management unit 131 and the notification unit 133) may be installed in the server 600 so that the processor 601 can execute the program. As another example, in the server 600, a module including the processor 601 and the memory 602 may be mounted and the management unit 131 and the notification unit 133 may be implemented in the module. In this case, the module may store a program causing the processor to function as the management unit 131 and the notification unit 133 in the memory 602 and the processor 601 may execute the program. As described above, the server 600 or the module may be provided as a device including the management unit 131 and the notification unit 133 or the program causing the processor to function as the management unit 131 and the notification unit 133 may be provided. A readable storage medium storing the program may be provided.

<5.2. Application Example of the Wireless Communication Terminal 200>>

First Application Example

Figure 16:
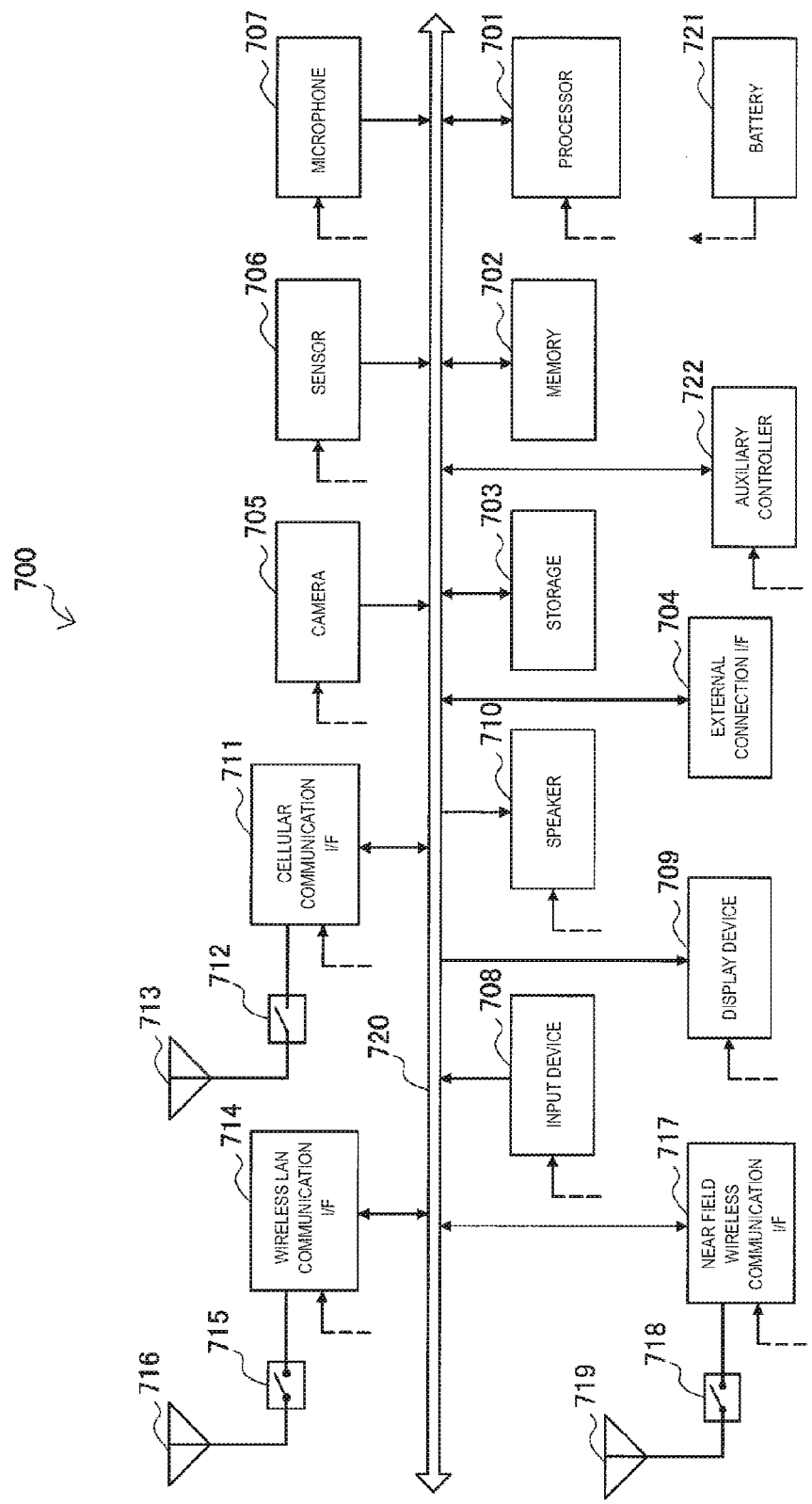
FIG. 16 is a block diagram illustrating an example of a schematic configuration of a smartphone.

FIG. 16 is a block diagram illustrating an example of a schematic configuration of a smartphone 700 to which the technology of the present disclosure may be applied. The smartphone 700 includes a processor 701, a memory 702, a storage 703, an external connection interface 704, a camera 705, a sensor 706, a microphone 707, an input device 708, a display device 709, a speaker 710, a cellular communication interface 711, an antenna switch 712, an antenna 713, a wireless LAN communication interface 714, an antenna switch 715, an antenna 716, a near field wireless communication interface 717, an antenna switch 718, an antenna 719, a bus 720, a battery 721, and an auxiliary controller 722.

The processor 701 may be, for example, a CPU or a system-on-chip (SoC), and controls functions of an application layer and another layer of the smartphone 700. The memory 702 includes a RAM and a ROM, and stores a program that is executed by the processor 701 and data. The storage 703 can include a storage medium such as a semiconductor memory and a hard disk. The external connection interface 704 is an interface for connecting an external device such as a memory card or a universal serial bus (USB) device to the smartphone 700.

The camera 705 includes an image sensor, for example, a charge coupled device (CCD) and a complementary metal oxide semiconductor (CMOS), and generates captured images. The sensor 706 can include a group of sensors, for example, a measurement sensor, a gyro sensor, a geomagnetic sensor, and an acceleration sensor. The microphone 707 converts sounds that are input to the smartphone 700 to audio signals. The input device 708 includes, for example, a touch sensor configured to detect touch onto a screen of the display device 709, a keypad, a keyboard, a button, or a switch, and receives an operation or an information input from a user. The display device 709 includes a screen such as a liquid crystal display (LCD) and an organic light-emitting diode (OLED) display, and displays an output image of the smartphone 700. The speaker 710 converts audio signals that are output from the smartphone 700 to sounds.

The cellular communication interface 711 supports any cellular communication scheme such as LTE and LTE-Advanced, and performs wireless communication. The cellular communication interface 711 can typically include, for example, a base band (BB) processor and a radio frequency (RF) circuit. The BB processor may perform, for example, encoding/decoding, modulating/demodulating, and multiplexing/demultiplexing, and performs various types of signal processing for wireless communication. Meanwhile, the RF circuit may include, for example, a mixer, a filter, and an amplifier, and transmits and receives radio signals via the antenna 713. The cellular communication interface 711 may also be a one chip module that has the BB processor and the RF circuit integrated thereon. The cellular communication interface 711 may include a single BB processor or multiple BB processors. The cellular communication interface 711 may include a single RF circuit or multiple RF circuits. The antenna switch 712 switches a connection destination of the antenna 713 among a plurality of circuits included in the cellular communication interface 711. The antenna 713 has a single or a plurality of antenna elements (for example, a plurality of antenna elements constituting a multiple-input and multiple-output (MIMO) antenna), and is used for transmission and reception of radio signals by the cellular communication interface 711.

The wireless LAN communication interface 714 supports one or more of wireless LAN standards including IEEE 802.11a, 11b, 11g, 11n, 11ac, 11ad, and the like to execute wireless communication. The wireless LAN communication interface 714 can communicate with other devices via a wireless LAN access point in an infrastructure mode. In addition, the wireless LAN communication interface 714 can directly communicate with other devices in an ad hoc mode. The wireless LAN communication interface 714 can typically include a BB processor, an RF circuit, and the like. The wireless LAN communication interface 714 may be a one-chip module in which a memory that stores a communication control program, a processor that executes the program, and its relevant circuit are integrated. The antenna switch 715 switches a connection destination of the antenna 716 among a plurality of circuits included in the wireless LAN communication interface 714. The antenna 716 has a single or a plurality of antenna elements (for example, a plurality of antenna elements constituting a MIMO antenna), and is used for transmission and reception of radio signals by the wireless LAN communication interface 714.

The near field wireless communication interface 717 supports one or more of near field wireless communication standards (for example, Bluetooth (a registered trademark) and the like) to execute wireless communication. The near field wireless communication interface 717 can directly communicate with other devices. The near field wireless communication interface 717 can typically include a BB processor, an RF circuit, and the like. The near field wireless communication interface 717 may be a one-chip module in which a memory that stores a communication control program, a processor that executes the program, and its relevant circuit are integrated. The antenna switch 718 switches a connection destination of the antenna 719 among a plurality of circuits included in the near field wireless communication interface 717. The antenna 719 has a single or a plurality of antenna elements, and is used for transmission and reception of radio signals by the near field wireless communication interface 717.

As illustrated in FIG. 16, the smartphone 700 may have antennas corresponding to each of the cellular communication interface 711, the wireless LAN communication interface 714, and the near field wireless communication interface 717. Note that the smartphone 700 is not limited to the example of FIG. 16, and may have a shared antenna corresponding to two or more of the cellular communication interface 711, the wireless LAN communication interface 714, and the near field wireless communication interface 717. As an example, the smartphone 700 may have a shared antenna and antenna switch corresponding to the wireless LAN communication interface 714 and the near field wireless communication interface 717, instead of including the antenna switch 715 and the antenna 716, and the antenna switch 718 and the antenna 719. In addition, the shared antenna may be connected to one of the wireless LAN communication interface 714 and the near field wireless communication interface 717 by the antenna switch.

In addition, the smartphone 700 may have the cellular communication interface 711, the wireless LAN communication interface 714, and the near field wireless communication interface 717 as individual modules as illustrated in FIG. 16. Note that the smartphone 700 is not limited to the example of FIG. 16, and may have a one-chip module that includes two or more of the cellular communication interface 711, the wireless LAN communication interface 714, and the near field wireless communication interface 717. In this case, the smartphone 700 may include a shared antenna and antenna switch between the communication interfaces, or include antennas corresponding to each of the communication interfaces.

Note that the antenna switch 712, the antenna switch 715, and the antenna switch 718 may be omitted from the configuration of the smartphone 700.

The bus 720 connects the processor 701, the memory 702, the storage 703, the external connection interface 704, the camera 705, the sensor 706, the microphone 707, the input device 708, the display device 709, the speaker 710, the cellular communication interface 711, the wireless LAN communication interface 714, the near field wireless communication interface 717, and the auxiliary controller 722 to each other. The battery 721 supplies power to blocks of the smartphone 700 illustrated in FIG. 16 via feeder lines, which are partially shown as dashed lines in the drawing. The auxiliary controller 722 causes a minimum necessary function of the smartphone 700 to operate, for example, in a sleep mode.

The information acquisition unit 261 and the connection control unit 263 described with reference to FIG. 4 may be implemented by the processor 701 in the smartphone 700 illustrated in FIG. 16. Alternatively, at least one of these constituent elements may be implemented in the auxiliary controller 722, the wireless LAN communication interface 714, the cellular communication interface 711, and/or the near field wireless communication interface 717. As an example, a program causing the processor to function as the information acquisition unit 261 and the connection control unit 263 (for example, a device driver, an operating system (OS), application software, or the like) may be installed in the smartphone 700, and the processor 701, the auxiliary controller 722, the wireless LAN communication interface 714, the cellular communication interface 711, and/or the near field wireless communication interface 717 may execute the program. As another example, the smartphone 700 may have a module that includes the processor 701, the auxiliary controller 722, a part or all of the wireless LAN communication interface 714, a part or all of the cellular communication interface 711, and/or a part or all of the near field wireless communication interface 717 mounted therein, and the information acquisition unit 261 and the connection control unit 263 may be implemented in the module. In this case, the module may store a program causing the processor to function as the information acquisition unit 261 and the connection control unit 263 (in other words, a program for causing the processor to execute the operations of the information acquisition unit 261 and the connection control unit 263) and execute the program. As described above, the smartphone 700 or the module may be provided as a device provided with the information acquisition unit 261 and the connection control unit 263, and a program causing the processor to function as the information acquisition unit 261 and the connection control unit 263 may be provided. In addition, a readable storage medium storing the program may be provided.

Second Application Example

Figure 17:
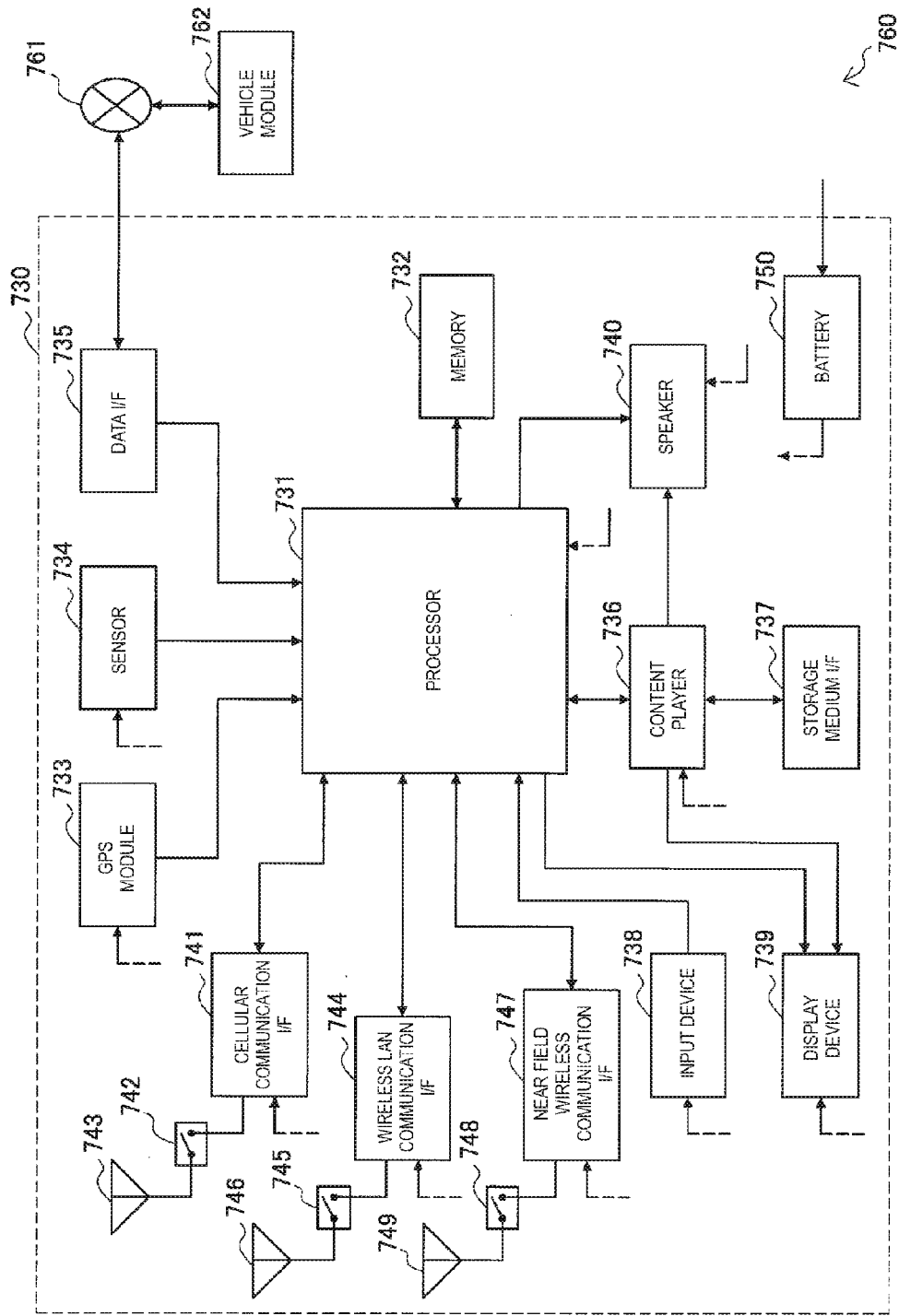
FIG. 17 is a block diagram illustrating an example of a schematic configuration of a car navigation device.

FIG. 17 is a block diagram illustrating an example of a schematic configuration of a car navigation device 730 to which the technology of the present disclosure may be applied. The car navigation device 730 includes a processor 731, a memory 732, a global positioning system (GPS) module 733, a sensor 734, a data interface 735, a content player 736, a storage medium interface 737, an input device 738, a display device 739, a speaker 740, a cellular communication interface 741, antenna switch 742, an antenna 743, a wireless LAN communication interface 744, an antenna switch 745, an antenna 746, a near field wireless communication interface 747, an antenna switch 748, an antenna 749, and a battery 750.

The processor 7311 may be, for example, a CPU or an SoC, and controls a navigation function and another function of the car navigation device 730. The memory 732 includes RAM and ROM, and stores a program that is executed by the processor 731, and data.

The GPS module 733 uses GPS signals received from a GPS satellite to measure a position (such as latitude, longitude, and altitude) of the car navigation device 730. The sensor 734 may include a group of sensors such as a gyro sensor, a geomagnetic sensor, and an air pressure sensor. The data interface 735 is connected to, for example, an in-vehicle network 761 via a terminal that is not shown, and acquires data generated by the vehicle, such as vehicle speed data.

The content player 736 reproduces content stored in a storage medium (such as a CD and a DVD) that is inserted into the storage medium interface 737. The input device 738 includes, for example, a touch sensor configured to detect touch onto a screen of the display device 739, a button, or a switch, and receives an operation or an information input from a user. The display device 739 includes a screen such as a LCD or an OLED display, and displays an image of the navigation function or content that is reproduced. The speaker 740 outputs sounds of the navigation function or the content that is reproduced.

The cellular communication interface 741 supports any cellular communication scheme such as LET and LTE-Advanced, and performs wireless communication. The cellular communication interface 741 may typically include, for example, a BB processor and an RF circuit. The BB processor may perform, for example, encoding/decoding, modulating/demodulating, and multiplexing/demultiplexing, and performs various types of signal processing for wireless communication. Meanwhile, the RF circuit may include, for example, a mixer, a filter, and an amplifier, and transmits and receives radio signals via the antenna 743. The cellular communication interface 741 may be a one chip module having the BB processor and the RF circuit integrated thereon. The cellular communication interface 741 may include a single BB processor, or may include multiple BB processors. The cellular communication interface 741 may include a single RF circuit, or may include multiple RF circuits. The antenna switch 742 switches a connection destination of the antenna 743 among a plurality of circuits included in the cellular communication interface 741. The antenna 743 has a single or a plurality of antenna elements (for example, a plurality of antenna elements constituting a MIMO antenna), and is used for transmission and reception of radio signals by the cellular communication interface 741.

The wireless LAN communication interface 744 supports one or more of wireless LAN standards including IEEE 802.11a, 11b, 11g, 11n, 11ac, 11ad, and the like to execute wireless communication. The wireless LAN communication interface 744 can communicate with other devices via a wireless LAN access point in an infrastructure mode. In addition, the wireless LAN communication interface 744 can directly communicate with other devices in an ad hoc mode. The wireless LAN communication interface 744 can typically include a BB processor, an RF circuit, and the like. The wireless LAN communication interface 744 may be a one-chip module in which a memory that stores a communication control program, a processor that executes the program, and its relevant circuit are integrated. The antenna switch 745 switches a connection destination of the antenna 746 among a plurality of circuits included in the wireless LAN communication interface 744. The antenna 746 has a single or a plurality of antenna elements (for example, a plurality of antenna elements constituting a MIMO antenna), and is used for transmission and reception of radio signals by the wireless LAN communication interface 744.

The near field wireless communication interface 747 supports one or more of near field wireless communication standards (for example, Bluetooth (a registered trademark) and the like) to execute wireless communication. The near field wireless communication interface 747 can directly communicate with other devices. The near field wireless communication interface 747 can typically include a BB processor, an RF circuit, and the like. The near field wireless communication interface 747 may be a one-chip module in which a memory that stores a communication control program, a processor that executes the program, and its relevant circuit are integrated. The antenna switch 748 switches a connection destination of the antenna 749 among a plurality of circuits included in the near field wireless communication interface 747. The antenna 749 has a single or a plurality of antenna elements, and is used for transmission and reception of radio signals by the near field wireless communication interface 747.

As illustrated in FIG. 17, the car navigation device 730 may have antennas corresponding to each of the cellular communication interface 741, the wireless LAN communication interface 744, and the near field wireless communication interface 747. Note that the car navigation device 730 is not limited to the example of FIG. 16, and may have a shared antenna corresponding to two or more of the cellular communication interface 741, the wireless LAN communication interface 744, and the near field wireless communication interface 747. As an example, the car navigation device 730 may have a shared antenna and antenna switch corresponding to the wireless LAN communication interface 744 and the near field wireless communication interface 747, instead of including the antenna switch 745 and the antenna 746, and the antenna switch 748 and the antenna 749. In addition, the shared antenna may be connected to one of the wireless LAN communication interface 744 and the near field wireless communication interface 747 by the antenna switch.

In addition, the car navigation device 730 may have the cellular communication interface 741, the wireless LAN communication interface 744, and the near field wireless communication interface 747 as individual modules as illustrated in FIG. 17. Note that the car navigation device 730 is not limited to the example of FIG. 16, and may have a one-chip module that includes two or more of the cellular communication interface 741, the wireless LAN communication interface 744, and the near field wireless communication interface 747. In this case, the car navigation device 730 may include a shared antenna and antenna switch between the communication interfaces, or include antennas corresponding to each of the communication interfaces.

Note that the antenna switch 742, the antenna switch 745, and the antenna switch 748 may be omitted from the configuration of the car navigation device 730.

The battery 750 supplies power to blocks of the car navigation device 730 illustrated in FIG. 17 via feeder lines that are partially shown as dashed lines in the drawing. The battery 750 accumulates power supplied form the vehicle.

The information acquisition unit 261 and the connection control unit 263 described with reference to FIG. 4 may be implemented by the processor 731 in the car navigation device 730 illustrated in FIG. 17. Alternatively, at least one of these constituent elements may be implemented in the wireless LAN communication interface 744, the cellular communication interface 741, and/or the near field wireless communication interface 747. As an example, a program causing the processor to function as the information acquisition unit 261 and the connection control unit 263 (for example, a device driver, an OS, application software, or the like) may be installed in the car navigation device 730, and the processor 731, the wireless LAN communication interface 744, the cellular communication interface 741, and/or the near field wireless communication interface 747 may execute the program. As another example, the car navigation device 730 may have a module that includes the processor 731, a part or all of the wireless LAN communication interface 744, a part or all of the cellular communication interface 741, and/or a part or all of the near field wireless communication interface 747 mounted therein, and the information acquisition unit 261 and the connection control unit 263 may be implemented in the module. In this case, the module may store a program causing the processor to function as the information acquisition unit 261 and the connection control unit 263 (in other words, a program for causing the processor to execute the operations of the information acquisition unit 261 and the connection control unit 263) and execute the program. As described above, the car navigation device 730 or the module may be provided as a device provided with the information acquisition unit 261 and the connection control unit 263, and a program causing the processor to function as the information acquisition unit 261 and the connection control unit 263 may be provided. In addition, a readable storage medium storing the program may be provided.

The technology of the present disclosure may also be realized as an in-vehicle system (or a vehicle) 760 including one or more blocks of the car navigation device 730, the in-vehicle network 761, and a vehicle module 762. That is, an in-vehicle system (or a vehicle) 940 may be provided as a device including the information acquisition unit 261 and the connection control unit 263. The vehicle module 762 generates vehicle data such as vehicle speed, engine speed, and trouble information, and outputs the generated data to the in-vehicle network 761.

6. Conclusion

The devices and the processes according to the embodiments of the present disclosure have been described as above with reference to FIGS. 1 to 17.

According to the embodiments of the present disclosure, the management device 100 is provided with the management unit 131 that issues identification information (i.e., a connection ID) for a direct connection between two wireless communication terminals 200 and the notification unit 133 that notifies the two wireless communication terminals 200 of the identification information.

In addition, according to the embodiments of the present disclosure, the wireless communication terminal 200 is provided with the information acquisition unit 261 that acquires the identification information (i.e., a connection ID) which is identification information for the direct connection between the two wireless communication terminals 200 and is issued from another device (i.e., the management device 100) that is different from the two wireless communication terminals 200 and the connection control unit 263 that performs control for the direct connection using the identification information.

Therefore, for example, it is possible to prevent a connection with an unintended wireless communication terminal without distributing identification information of a wireless communication terminal.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example of a direct connection only between two wireless communication terminals, for example, has been described, the present disclosure is not limited thereto. When there are three or more wireless communication terminals, for example, a connection ID for a direct connection between each pair of the wireless communication terminals may be issued. When there are three wireless communication terminals, for example, three connection IDs may be issued. In addition, when there is already an existing direct connection between two wireless communication terminals, a connection ID for a new direct connection between another wireless communication terminal and one (or each) of the two wireless communication terminals may be issued. In this case, considering communication parameters (for example, roles, channels, and the like) for the existing direct connection, communication parameters for the new direct connection may be generated. Accordingly, for example, a new direct connection can be established without causing a change in the existing direct connection (for example, a change in the roles, a change in the channels, or the like).

In addition, although the example in which a connection ID for a direct connection only between two wireless communication terminals is issued has been described, for example, the present disclosure is not limited thereto. For example, a shared connection ID for a direct connection among three or more wireless communication terminals may be issued.

In addition, although the example in which one connection ID for a direct connection between two wireless communication terminals is issued has been described, the present disclosure is not limited thereto. For example, two connection IDs for a direct connection between two wireless communication terminals may be issued and the two connection IDs may correspond to each other. Further, one of the two wireless communication terminals may be notified of one of the two connection IDs, and the other one of the two wireless communication terminals may be notified of the other one of the two connection IDs. As an example, the value of one of the two connection IDs may be a value calculated from the value of the other one of the two connection IDs according to a predetermined rule. As another example, one of the two connection IDs may be an encryption key, and the other one of the two connection IDs may be a decryption key.

In addition, the example in which, for example, a direct connection between two wireless communication terminals is a direct connection that complies with a wireless LAN standard has been mainly described, the present disclosure is not limited thereto. As an example, the direct connection may be a direct connection that complies with a cellular communication standard (for example, LTE, LTE-Advanced, WiMAX, or the like). As another example, the direct connection may be a direct connection that complies with a near field wireless communication standard (for example, Bluetooth (a registered trademark), or the like).

In addition, the example in which, for example, a connection node included in the communication system is a base station of a cellular network has been described, the present disclosure is not limited thereto. As an example, the connection node may be a wireless LAN access point.

In addition, although the example in which the management device is a separate device from the connection node has been described, the present disclosure is not limited thereto. The management device may be, for example, a device included in the connection node. That is, the constituent elements of the management device (for example, the management unit and the notification unit) may be provided in the connection node.

In addition, although the example in which a wireless communication terminal can operate in any of the first role (for example, a group owner) and the second role (for example, a client) has been described, the present disclosure is not limited thereto. For example, the terminal may be, for example, a wireless communication terminal that can operate in one of the first role and the second role.

In addition, the processing steps in the processes of the present specification may not necessarily be performed chronologically in the orders described in the flowcharts or the sequence diagrams. For example, the processing steps in each of the processes may be performed in different orders from the orders described in the flowcharts or the sequence diagrams or may be performed in parallel.

It is also possible to generate a computer program causing the processors (for example, CPUs or DSPs) included in the devices (for example, the management device, the wireless communication terminal) of the present specification to function as the constituent elements (for example, the management unit and the notification unit, or the information acquisition unit and the connection control unit) of the devices (in other words, a computer program causing the processors to perform the operations of the constituent elements of the devices). A storage medium storing the computer program may be provided. A device (for example, a finished product or a module (a part, a processing circuit, a chip, or the like) for the finished product) including a memory storing the computer program and one or more processors capable of executing the computer program may also be provided. Further, methods including operations of the constituent elements (for example, the management unit and the notification unit, or the information acquisition unit and the connection control unit) of the above devices may be included in the technology according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A device including:

an acquisition unit configured to acquire identification information that is identification information for a direct connection between two wireless communication terminals and is issued by another device that is different from the two wireless communication terminals; and a control unit configured to perform control for the direct connection using the identification information.

(2) The device according to (1), wherein the device is one wireless communication terminal of the two wireless communication terminals or a module for the one wireless communication terminal.

(3) The device according to (1), wherein the control includes authentication of the other wireless communication terminal trying a direct connection with the one wireless communication terminal.

(4) The device according to (3), wherein the authentication includes verifying whether information provided by the other wireless communication terminal is information corresponding to the identification information.

(5) The device according to (3), wherein the control unit performs the authentication using the identification information, and wherein the authentication succeeds only when a use condition for the identification information is satisfied.

(6) The device according to (5), wherein the use condition is that authentication using the identification information has not succeeded yet.

(7) The device according to any one of (3) to (6), wherein the control includes admitting or rejecting a direct connection to the one wireless communication terminal by the other wireless communication terminal, and wherein, when the authentication fails, the control unit rejects the direct connection by the other wireless communication terminal.

(8) The device according to (7), wherein, when the authentication succeeds, the control unit admits the direct connection by the other wireless communication terminal in a limited period of time, and rejects the direct connection by the other wireless communication terminal in a period other than the limited period of time.

(9) The device according to (8), wherein the limited period of time is a period of time taken until data communication between the one wireless communication terminal and the other wireless communication terminal is possible.

(10) The device according to (8), wherein the limited period of time includes a period of time taken until a direct connection between the one wireless communication terminal and the other wireless communication terminal is determined to be stable.

(11) The device according to (8), wherein the limited period of time includes a period of time after a direct connection between the one wireless communication terminal and the other wireless communication terminal is determined to be unstable.

(12) The device according to (2), wherein the control includes providing the identification information to the other wireless communication terminal of the two wireless communication terminals.

(13) The device according to any one of (2) to (12), wherein the control unit notifies a management device that manages the direct connection of establishment of the direct connection.

(14) The device according to any one of (2) to (13), wherein the control unit disconnects the direct connection according to a request for disconnection by a management device that manages the direct connection.

(15) The device according to any one of (2) to (14), wherein the control unit disconnects the direct connection when a connection with a management device that manages the direct connection is disconnected.

(16) The device according to any one of (2) to (15), wherein the control unit disconnects the direct connection when communication between the two wireless communication terminals is not performed for a predetermined time or longer.

(17) The device according to any one of (2) to (16), wherein the control unit notifies a management device that manages the direct connection of disconnection of the direct connection.

(18) A method including:
acquiring identification information that is identification information for a direct connection between two wireless communication terminals and is issued by another device that is different from the two wireless communication terminals; and
performing, by a processor, control for the direct connection using the identification information.

(19) A device including:
a management unit configured to issue identification information for a direct connection between two wireless communication terminals; and
a notification unit configured to notify the two wireless communication terminals of the identification information.

(20) A method including:
issuing, by a processor, identification information for a direct connection between two wireless communication terminals; and
notifying the two wireless communication terminals of the identification information.

(21) A program for causing a processor to execute:
acquiring identification information that is identification information for a direct connection between two wireless communication terminals and is issued by another device that is different from the two wireless communication terminals; and
performing control for the direct connection using the identification information.

(22) A readable recording medium having a program recorded thereon, the program causing a processor to execute:
acquiring identification information that is identification information for a direct connection between two wireless communication terminals and is issued by another device that is different from the two wireless communication terminals; and
performing control for the direct connection using the identification information.

(23) A program for causing a processor to execute:
issuing identification information for a direct connection between two wireless communication terminals; and
notifying the two wireless communication terminals of the identification information.

(24) A readable recording medium having a program recorded thereon, the program causing a processor to execute:
issuing identification information for a direct connection between two wireless communication terminals; and
notifying the two wireless communication terminals of the identification information.

REFERENCE SIGNS LIST 1 communication system
100 management device
131 management unit
133 notification unit
200 wireless communication terminal
261 information acquisition unit
263 connection control unit

The invention claimed is:

1. A device, comprising:
an acquisition unit configured to acquire identification information for a direct connection between a first wireless communication terminal and a second wireless communication terminal,
wherein the identification information is issued by a management device that is different from the first wireless communication terminal and the second wireless communication terminal; and
a control unit configured to:
control the direct connection based on the identification information, and
disconnect the direct connection based on a request for disconnection by the management device that manages the direct connection.

2. The device according to claim 1, wherein the device is one of the first wireless communication terminal or the second wireless communication terminal or a module for the first wireless communication terminal or the second wireless communication terminal.

3. The device according to claim 1, wherein the control unit is further configured to authenticate the first wireless communication terminal that tries a direct connection with the second wireless communication terminal.

4. The device according to claim 3, wherein the authentication is based on verification of information provided by the first wireless communication terminal that corresponds to the identification information.

5. The device according to claim 3,
wherein the control unit is further configured to execute the authentication based on the identification information, and
wherein the authentication succeeds based on an availability condition for the identification information that is satisfied.

6. The device according to claim 5, wherein the availability condition indicates a lack of an authentication based on the identification information.

7. The device according to claim 3,
wherein the control unit is further configured to admit or reject a direct connection to the second wireless communication terminal by the first wireless communication terminal, and
wherein, based on failure of the authentication, the control unit is further configured to reject the direct connection by the first wireless communication terminal.

8. The device according to claim 7, wherein, based on success of the authentication, the control unit is further configured to admit the direct connection by the first wireless communication terminal in a limited period of time, and reject the direct connection by the first wireless communication terminal in a period other than the limited period of time.

9. The device according to claim 8, wherein the limited period of time is a period of time taken until data communication exists between the second wireless communication terminal and the first wireless communication terminal.

10. The device according to claim 8, wherein the limited period of time includes a period of time taken until a direct connection between the second wireless communication terminal and the first wireless communication terminal is stable.

11. The device according to claim 8, wherein the limited period of time includes a period of time after a direct connection between the second wireless communication terminal and the first wireless communication terminal is unstable.

12. The device according to claim 1, wherein the control unit is further configured to provide the identification information to the first wireless communication terminal.

13. The device according to claim 1, wherein the control unit is further configured to notify the management device regarding establishment of the direct connection.

14. The device according to claim 1, wherein the control unit is further configured to disconnect the direct connection based on a connection with the management device that is disconnected.

15. The device according to claim 1, wherein the control unit is further configured to disconnect the direct connection based on a lack of communication between the first wireless communication terminal and the second wireless communication terminal for a set period of time or longer.

16. The device according to claim 1, wherein the control unit is further configured to notify the management device of the disconnection of the direct connection.

17. A method, comprising:
acquiring identification information for a direct connection between a first wireless communication terminal and a second wireless communication terminal,
wherein the identification information is issued by a management device that is different from the first wireless communication terminal and the second wireless communication terminal;
controlling, by a processor, the direct connection based on the identification information; and
disconnecting, by the processor, the direct connection based on a request for disconnection by the management device that manages the direct connection.

18. A device, comprising:
a management unit configured to issue identification information for a direct connection between a first wireless communication terminal and a second wireless communication terminal to at least one of the first wireless communication terminal or the second wireless communication terminal;
a notification unit configured to notify the first wireless communication terminal and the second wireless communication terminal of the identification information; and
a communication unit configured to transmit a request for disconnection of the direct connection to at least one of the first wireless communication terminal or the second wireless communication terminal, wherein at least one of the first wireless communication terminal or the second wireless communication terminal disconnects the direct connection based on the transmitted request.

19. A method, comprising:
issuing, by a processor, identification information for a direct connection between a first wireless communication terminal and a second wireless communication terminal to at least one of the first wireless communication terminal or the second wireless communication terminal;
notifying the first wireless communication terminal and the second wireless communication terminal of the identification information; and
transmitting a request for disconnection of the direct connection to at least one of the first wireless communication terminal or the second wireless communication terminal, wherein at least one of the first wireless communication terminal or the second wireless communication terminal disconnects the direct connection based on the transmitted request.

* * * * *